US009807742B2

(12) United States Patent
Guan et al.

(10) Patent No.: US 9,807,742 B2
(45) Date of Patent: Oct. 31, 2017

(54) METHOD AND DEVICE FOR TRANSMITTING UPLINK CONTROL INFORMATION

(71) Applicant: Huawei Technologies Co., Ltd., Shenzhen (CN)

(72) Inventors: Lei Guan, Shenzhen (CN); Yan Cheng, Shenzhen (CN); Lixia Xue, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 14/617,425

(22) Filed: Feb. 9, 2015

(65) Prior Publication Data
US 2015/0156768 A1 Jun. 4, 2015

Related U.S. Application Data

(63) Continuation of application No. PCT/CN2013/076155, filed on May 23, 2013.

(30) Foreign Application Priority Data

Aug. 17, 2012 (WO) ................. PCT/CN2012/080309

(51) Int. Cl.
*H04W 4/00* (2009.01)
*H04W 72/04* (2009.01)
(Continued)

(52) U.S. Cl.
CPC ....... *H04W 72/0413* (2013.01); *H04L 1/1607* (2013.01); *H04W 76/025* (2013.01)

(58) Field of Classification Search
CPC ........... H04W 76/025; H04W 72/0413; H04W 72/04; H04L 1/1607
(Continued)

(56) References Cited

U.S. PATENT DOCUMENTS

2011/0134774 A1* 6/2011 Pelletier .............. H04W 52/365
370/252
2012/0155337 A1 6/2012 Park
(Continued)

FOREIGN PATENT DOCUMENTS

CN 101873602 A 10/2010
CN 101958777 A 1/2011
(Continued)

OTHER PUBLICATIONS

"LTE; Evolved Universal Terrestrial Radio Access(E-UTRA)and Evolved Universal Terrestrial Radio Access Network(E-UTRAN); Overall Description; Stage 2 (3GPP TS 36.300 version 10.2.0 Release 10)," ETSI TS 136.300, V10.2.0, $3^{rd}$ Generation Partnership Project, Valbonne, France (Jan. 2011).
(Continued)

*Primary Examiner* — Sai-Ming Chan
(74) *Attorney, Agent, or Firm* — Leydig, Voit & Mayer, Ltd.

(57) ABSTRACT

A method and a device for transmitting an uplink control channel are provided. A user equipment (UE) receives downlink data which is scheduled by a downlink control channel from a network device, where the downlink control channel is a downlink control channel corresponding to a serving cell, the serving cell is a serving cell of at least two serving cells configured for the UE, the at least two serving cells include one primary serving cell and at least one secondary serving cell. The UE selects identity information according to the downlink control channel. The UE generates a physical uplink control channel corresponding to the downlink data by using the selected identity information, and transmits the physical uplink control channel on a channel resource of the physical uplink control channel.

18 Claims, 8 Drawing Sheets

(51) Int. Cl.
*H04W 76/02* (2009.01)
*H04L 1/16* (2006.01)

(58) Field of Classification Search
USPC .......................................................... 370/329
See application file for complete search history.

(56) References Cited

U.S. PATENT DOCUMENTS

| 2012/0207111 | A1 | 8/2012 | Jang et al. | |
|---|---|---|---|---|
| 2013/0094466 | A1 | 4/2013 | Kim et al. | |
| 2013/0100828 | A1* | 4/2013 | Kishiyama | H04W 52/42 370/252 |
| 2013/0163487 | A1 | 6/2013 | Yang et al. | |
| 2013/0176982 | A1 | 7/2013 | Han et al. | |
| 2013/0242924 | A1* | 9/2013 | Kim | H04W 72/042 370/329 |
| 2014/0195025 | A1* | 7/2014 | Wieder | G06F 21/10 700/94 |
| 2014/0314031 | A1* | 10/2014 | Kim | H04L 1/1861 370/329 |

FOREIGN PATENT DOCUMENTS

| CN | 101989898 A | 3/2011 |
|---|---|---|
| CN | 102083189 A | 6/2011 |
| CN | 102142941 A | 8/2011 |
| CN | 102355733 A | 2/2012 |
| CN | 102412883 A | 4/2012 |
| EP | 2584845 A2 | 4/2013 |
| EP | 2618628 A1 | 7/2013 |
| EP | 2639984 A2 | 9/2013 |
| EP | 2785128 A1 | 10/2014 |
| WO | WO 2011162521 A2 | 12/2011 |
| WO | WO 2012036289 A1 | 3/2012 |
| WO | WO 2012036534 A2 | 3/2012 |
| WO | WO 2012050342 A2 | 4/2012 |
| WO | WO 2012064154 A2 | 5/2012 |
| WO | WO 2013049769 A1 | 4/2013 |
| WO | WO 2013055174 A2 | 4/2013 |

OTHER PUBLICATIONS

Office Action in corresponding European Patent Application No. 13829892.2 (dated Oct. 14, 2016).

* cited by examiner

METHOD AND DEVICE FOR TRANSMITTING UPLINK CONTROL INFORMATION

CROSS REFERENCE TO RELATED APPLICATIONS

This application is a continuation of International Patent Application No. PCT/CN2013/076155, filed on May 23, 2013, which claims priority to International Patent Application No. PCT/CN2012/080309, filed on Aug. 17, 2012, both of which are hereby incorporated by reference in their entireties.

TECHNICAL FIELD

The present invention relates to the field of radio communication and, in particular, to a method and a device for transmitting uplink control information.

BACKGROUND

In the early long term evolution (LTE) system, both uplink and downlink of a user equipment (UE) can only be served by one carrier. With the progress of standards, the carrier aggregation (CA) technology is introduced, at this point one UE may be served by multiple uplink carriers simultaneously, and may also be served by multiple downlink carriers simultaneously, so as to improve the peak data rate of the UE. All early carrier aggregation systems are the aggregation of carriers under the same base station, or the carrier aggregation of a macro cell and a micro cell having ideal backhaul. Where, two nodes having ideal backhaul can be seen as the same base station. Where, the ideal backhaul means that the transmission delay of the backhaul is very small and can be ignored, for example, the backhaul of a macro base station and a micro base station which is constituted via fiber-optic links, where the delay among multiple nodes connected via these fiber-optic links is very small. In this case, when scheduling one carrier of the aggregation carriers, the base station can know in real time the scheduling condition on another carrier, therefore, the joint scheduling can be adopted among these carriers. In an existing CA system, acknowledge (ACK,) or non-acknowledge (NACK) corresponding to the downlink data scheduling is born on the physical uplink control channel (PUCCH), the PUCCH is only transmitted on one uplink carrier, this uplink carrier is called the uplink primary carrier, and the sequence related information of this PUCCH is determined by the cell identity corresponding to this uplink carrier.

In the existing CA system, there are two kinds of PUCCH feedback modes, one is a feedback mode of PUCCH format 1b in combination with channel selection, and the other is a feedback mode of PUCCH format 3.

For the feedback mode of PUCCH format 1b in combination with channel selection:

The data born on the PUCCH format 1b channel is constituted by the cyclic shift of a Zad-off Chu (ZC) sequence in the frequency domain, and is constituted by the ACK or NACK multiplied by one spreading code in the time domain. Different PUCCH format 1b channels of one resource block (RB) are distinguished through the abovementioned cyclic shift of the ZC sequence and the time-domain spreading code, that is, one PUCCH format 1b channel includes one cyclic shift of ZC sequence and one time-domain spreading code, where the ZC sequence is determined by the cell identity corresponding to the uplink carrier which transmits this PUCCH. The channel selection is that the same PUCCH information (such as modulation symbol) transmitted on different PUCCH channels means different information, such as the same modulation symbol transmitted on the PUCCH format 1b channel 1 means ACK, while the same modulation symbol transmitted on the PUCCH format 1b channel 2 means NACK.

For downlink scheduling of the primary carrier, the way of allocating the PUCCH format 1b channel resource specifically includes: the PUCCH format 1b channel resource is determined implicitly through a corresponding PDCCH parameter, for example, the PUCCH format 1b resource is determined through the CCE index of the PDCCH, or the PUCCH format 1b resource is determined through the eCCE index of the ePDCCH and/or the antenna port number, etc.; to facilitate the description, hereinafter, the PDCCH and ePDCCH are both expressed as PDCCH; for downlink scheduling of the secondary carrier, the solution of high-level reserve in combination with PDCCH dynamic selection is adopted as the way of allocating the PUCCH format 1b resource, which specifically includes: the PUCCH format 1b channel resource is configured as four groups of channel resources through a radio resource control (RRC) signaling, and the base station dynamically indicates to the UE, through scheduling two bits of the PDCCH of the secondary carrier, one group of these four groups of channel resources for current use.

For the feedback mode of PUCCH format 3:

The PUCCH format 3 has no cyclic shift of the ZC sequence in the frequency domain, but has the spreading code in the time domain, where different PUCCH format 3 channel resources of one resource block are distinguished through the abovementioned spreading code. Different cyclic shift code of the modulation symbol which is spread by using the time-domain spreading code can be adopted for the PUCCH format 3 channels on different orthogonal frequency division multiplexing (OFDM) symbols of one sub-frame. Which cyclic shift code being adopted is determined upon the cell identity corresponding to the uplink carrier of this PUCCH.

The solution of high-level reserve in combination with PDCCH dynamic selection is adopted as the way of allocating the PUCCH format 3 channel resource, which specifically includes: the PUCCH format 3 channel resource may be configured as four resources through the RRC signaling, and the base station dynamically indicates to the UE, through scheduling two bits of the PDCCH of the secondary carrier, one of these four resources for current use.

In the subsequently evolved LTE system, the carrier aggregation among base stations having non-ideal backhaul will be introduced, that is, it is impossible to transfer data among base stations in real time, which results in that the scheduling among multiple carriers belonging to different base stations is performed independently, that is, when one base station schedules one carrier of the aggregation carriers, the base station does not know the condition on another carrier which is scheduled by another base station.

For example: the macro cell deployed at frequency f1 mainly provides system information and performs radio link monitoring and mobility management, so as to ensure continuity of services; multiple micro cells deployed at frequency f2 mainly provides the transmission of high data rate services, and the multiple micro cells are in the coverage range of the macro cell. The backhaul among the abovementioned macro cell and micro cells, or among the micro cells are all non-ideal backhaul, that is, the information cannot be interacted in real time.

In the abovementioned CA system among base stations having non-ideal backhaul, since the data scheduling of multiple downlink carriers is performed independently by each base station, for example, the macro base station at frequency f1 and the micro base station at frequency f2 schedule independently, one direct solution is transmitting multiple PUCCHs on multiple carriers respectively, so that the ACK or NACK can be fed back to respective base station respectively. However, the uplinks of some low-end UEs do not have the capacity of transmitting multiple carriers; even if the uplinks of some high-end UEs have the capacity of transmitting multiple carriers, when the UE power is limited, transmitting multiple PUCCHs simultaneously will affect the PUCCH performance.

SUMMARY

For above reasons, embodiments of the present invention provide a method and a device for transmitting uplink control information, so as to solve the problem of how to transmit the PUCCH in a CA system.

A first aspect provides a method for transmitting an uplink control channel, the method includes:

receiving, by a user equipment (UE), downlink data which is scheduled by a downlink control channel from a network device, where the downlink control channel is a downlink control channel corresponding to a serving cell, the serving cell is a serving cell of at least two serving cells configured for the UE, the at least two serving cells include one primary serving cell and at least one secondary serving cell;

selecting identity information according to the downlink control channel;

generating a physical uplink control channel corresponding to the downlink data by using the selected identity information; and transmitting the physical uplink control channel on a channel resource of the physical uplink control channel.

A second aspect provides a method for receiving an uplink control channel, the method includes:

transmitting, by a network device, downlink data scheduled by a downlink control channel to a user equipment (UE), where the downlink control channel is a downlink control channel corresponding to an secondary serving cell which corresponds to the network device, or the downlink control channel is a downlink control channel corresponding to a primary serving cell which corresponds to the network device, the secondary serving cell is a serving cell of at least two serving cells configured for the UE, the at least two serving cells further include the primary serving cell;

determining identity information which may be used by the UE; and detecting, by using the identity information which may be used, a physical uplink control channel corresponding to the downlink data on a channel resource for feeding back the physical uplink control channel, where the physical uplink control channel is generated by the UE by using one kind of the identity information which may be used by the UE.

A third aspect provides a user equipment, the user equipment (UE) includes:

a receiving module, configured to receive downlink data which is scheduled by a downlink control channel from a network device, where the downlink control channel is a downlink control channel corresponding to a serving cell, the serving cell is a serving cell of at least two serving cells configured for the UE, the at least two serving cells include one primary serving cell and at least one secondary serving cell;

a selecting module, configured to select identity information according to the downlink control channel corresponding to the downlink data received by the receiving module;

a generating module, configured to generate a physical uplink control channel corresponding to the downlink data by using the identity information selected by the selecting module; and a transmitting module, configured to transmit the physical uplink control channel on a channel resource of the physical uplink control channel generated by the generating module.

A fourth aspect provides a network device, the network device includes:

a transmitting module, configured to transmit downlink data scheduled by a downlink control channel to a user equipment (UE), where the downlink control channel is a downlink control channel corresponding to an secondary serving cell, or the downlink control channel is a downlink control channel corresponding to a primary serving cell which corresponds to the network device, the secondary serving cell is a serving cell of at least two serving cells configured for the UE, the at least two serving cells further include the primary serving cell;

a determining module, configured to determine identity information which may be used by the UE after the transmitting module transmits the downlink data; and a receiving module, configured to, on a channel resource for feeding back a physical uplink control channel, detect the physical uplink control channel corresponding to the downlink data by using the identity information which may be used and is determined by the determining module, where the physical uplink control channel is generated by the UE by using one kind of the identity information which may be used by the UE.

A fifth aspect, a user equipment, where the user equipment (UE) includes:

a receiver, configured to receive downlink data which is scheduled by a downlink control channel from a network device, where the downlink control channel is a downlink control channel corresponding to a serving cell, the serving cell is a serving cell of at least two serving cells configured for the UE, the at least two serving cells include one primary serving cell and at least one secondary serving cell;

a processor, configured to select identity information according to the downlink control channel corresponding to the downlink data received by the receiver, and generate a physical uplink control channel corresponding to the downlink data by using the identity information; and a transmitter, configured to transmit the physical uplink control channel on a channel resource of the physical uplink control channel generated by the processor.

A sixth aspect provides a network device, the network device includes:

a transmitter, configured to transmit downlink data scheduled by a downlink control channel to a user equipment (UE), where the downlink control channel is a downlink control channel corresponding to an secondary serving cell, or the downlink control channel is a downlink control channel corresponding to a primary serving cell which corresponds to the network device, the secondary serving cell is a serving cell of at least two serving cells configured for the UE, the at least two serving cells further include one primary serving cell;

a processor, configured to determine identity information which may be used by the UE after the transmitter transmits the downlink data; and a receiver, configured to, on a channel resource for feeding back a physical uplink control channel, detect the physical uplink control channel corresponding to the downlink data by using the identity information which may be used and is determined by the processor, where the physical uplink control channel is generated by the UE by using one kind of the identity information which may be used by the UE.

Through the above solutions, since the physical uplink control channel transmitted by the UE is generated by using corresponding identity information, after receiving the physical uplink control channel, the network device which transmits the downlink control channel to the UE can distinguish the corresponding physical uplink control channel according to the identity information which is used, it achieves that the same PUCCH channel resource is reused among multiple network devices, without the need for learning in real time the scheduling condition of the downlink data of other base stations.

DESCRIPTION OF EMBODIMENTS

The abovementioned PUCCH transmitting mode in the prior art is not applicable in the carrier aggregation system among base stations. Since the downlink scheduling among the base stations is independent, each base station cannot learn in real time the scheduling condition of channel resources of other base stations, the abovementioned solution of allocating the PUCCH channel resource cannot be applied. For example, for the solution of high-level reserve in combination with PDCCH dynamic selection, assuming that f1 of the macro base station is the primary carrier, the macro base station cannot learn in real time the specific state of two bits indicated dynamically in the PDCCH scheduled by the micro base station, and then it is impossible to obtain the channel resource of PUCCH format 3 or PUCCH format 1b which is indicated explicitly.

Therefore, the PUCCH channel resource which needs to be received by multiple base stations simultaneously must be semi-static reserved or static reserved, for example, the PUCCH channel resource may be configured through the RRC signaling, however, further dynamically selecting one of multiple groups or multiple resources, which are notified from the RRC signaling, for use is not allowed. However the pure semi-static reserved PUCCH channel resource will cause relatively large resource overhead, especially in the case of relatively large amount of UEs which perform CA between the macro base station and micro base station in the coverage range of the macro base station, the problem of large channel resource overhead is particularly serious. Therefore, embodiments of the present invention adopt the channel resource reuse mechanism, that is, the same PUCCH channel resource or the same group of PUCCH channel resources can be used by multiple UEs simultaneously, and the interference problem caused by the resource reuse is reduced as much as possible.

In addition, for the carrier aggregation scenario having the condition of ideal backhaul, for example, the macro base station is at f1 and the micro base station is at f2, and the backhaul between the macro base station and the micro base station is ideal, the PUCCH for the micro base station to receive also needs to be considered to reduce uplink interference and improve power efficiency, thus the problem of PUCCH resource reuse needs to be considered between the micro base stations; sometimes the macro base station also needs to receive the PUCCH to obtain a better mobility performance, therefore the problem of the combination with receiving the PUCCH by the macro base station also needs to be considered.

Figure 1:
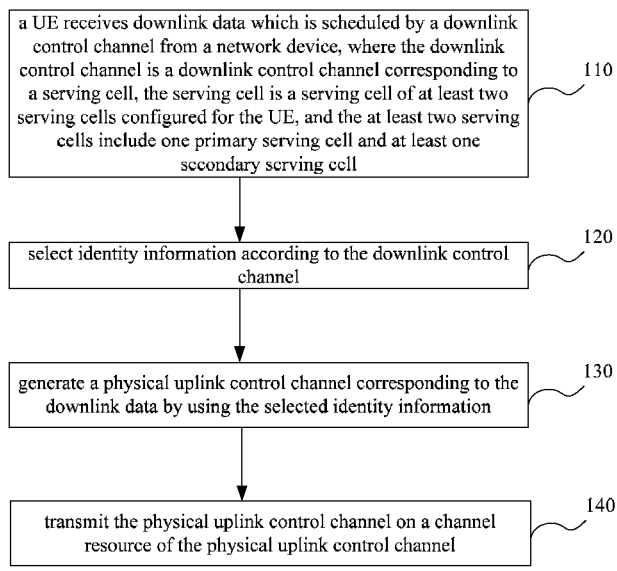
FIG. 1 is a flowchart of a method for transmitting uplink control information according to an embodiment of the present invention.

Based on the above problems, an embodiment of the present invention provides a method for transmitting uplink control information, as shown in FIG. 1. The method of this embodiment includes the following steps.

Step 110, a UE receives downlink data which is scheduled by a downlink control channel from a network device, where the downlink control channel is a downlink control channel corresponding to a serving cell, the serving cell is a serving cell of at least two serving cells configured for the UE, and the at least two serving cells include one primary serving cell and at least one secondary serving cell.

Step 120, select identity information according to the downlink control channel.

Step 130, generate a physical uplink control channel corresponding to the downlink data by using the selected identity information.

Step 140, transmit the physical uplink control channel on a channel resource of the physical uplink control channel.

By adopting the method of this embodiment, since the physical uplink control channel transmitted by the UE is generated by using corresponding identity information, after receiving the physical uplink control channel, the network device which transmits the downlink control channel to the UE can distinguish the corresponding physical uplink control channel according to the identity information which is used, it achieves that the same PUCCH channel resource is reused among multiple network devices, without the need for learning in real time the scheduling condition of the downlink data of other base stations, thereby achieving the cell splitting gain, and improving the use of the PUCCH channel resource. In addition, under the condition that the ideal backhaul exists between the macro and micro stations, an effect that the PUCCH is unloaded on the uplink carrier of the micro base station is achieved, and meanwhile the benefit of receiving radio resource control on the macro base station can be kept.

Figure 2:
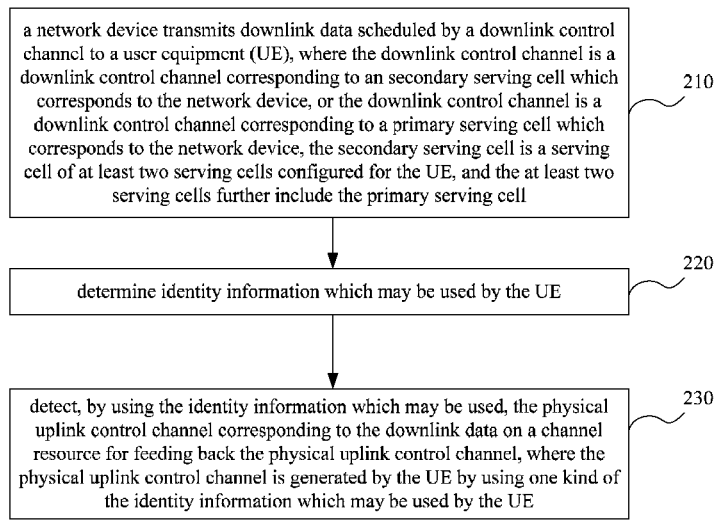
FIG. 2 is a flowchart of a method for transmitting uplink control information according to another embodiment of the present invention.

Another embodiment of the present invention provides a method for receiving an uplink control channel, as shown in FIG. 2. The method of this embodiment includes the following steps.

Step 210, a network device transmits downlink data scheduled by a downlink control channel to a user equipment (UE), where the downlink control channel is a downlink control channel corresponding to an secondary serving cell which corresponds to the network device, or the downlink control channel is a downlink control channel corresponding to a primary serving cell which corresponds to the network device, the secondary serving cell is a serving cell of at least two serving cells configured for the UE, and the at least two serving cells further include the primary serving cell.

Step 220, determine identity information which may be used by the UE.

Step 230, detect, by using the identity information which may be used, the physical uplink control channel corresponding to the downlink data on a channel resource for feeding back the physical uplink control channel, where the physical uplink control channel is generated by the UE by using one kind of the identity information which may be used by the UE.

By adopting the method of this embodiment, since the physical uplink control channel transmitted by the UE is generated by using corresponding identity information, after receiving the physical uplink control channel, the network device corresponding to the primary serving cell which transmits the downlink control channel to the UE can distinguish the corresponding physical uplink control channel according to the identity information, it achieves that the same PUCCH channel resource is reused among multiple network devices, without the need for learning in real time the scheduling condition of the PUCCH channel resources of other base stations, thereby achieving the cell splitting gain, and improving the use of the PUCCH channel resource. In addition, under the condition that the ideal backhaul exists between the macro and micro stations, an effect that the PUCCH unload on the uplink carrier of the micro base station is achieved, and meanwhile the benefit of receiving radio resource control on the macro base station can be kept.

Figure 3:
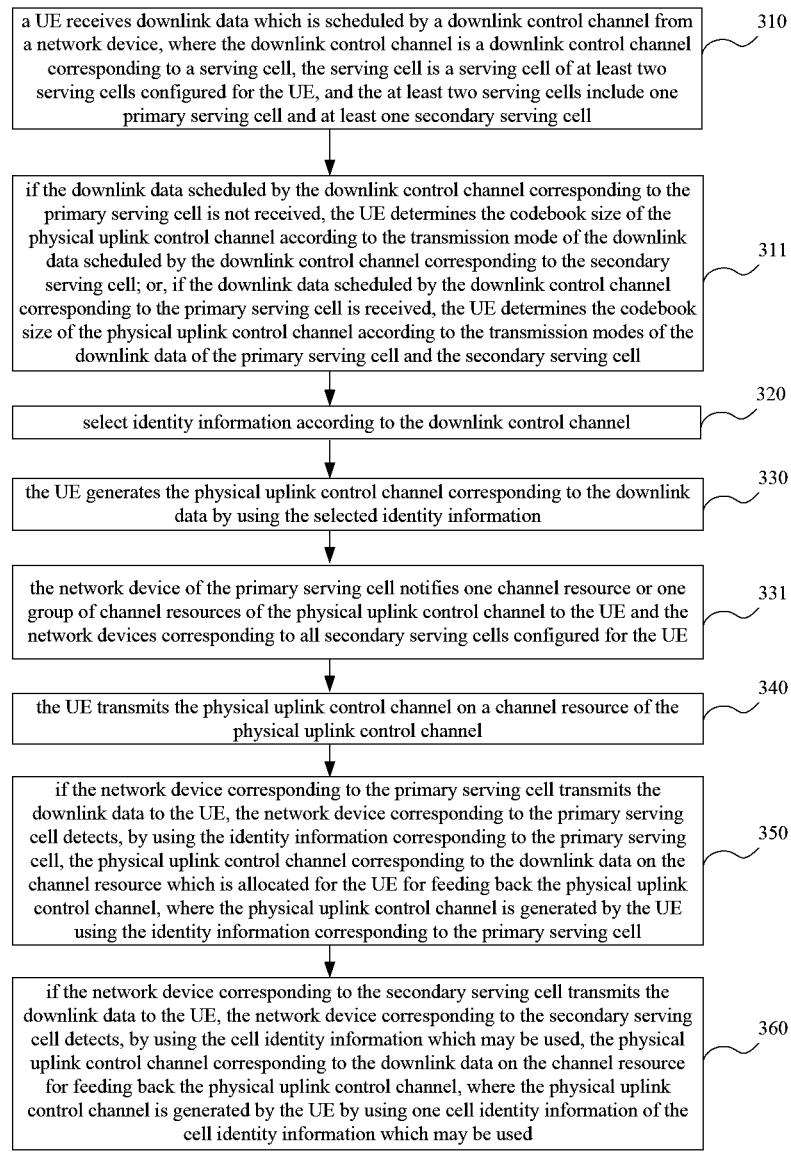
FIG. 3 is a flowchart of a method for transmitting uplink control information according to another embodiment of the present invention.

Another embodiment of the present invention further provides a method for transferring uplink control information, as shown in FIG. 3. The method of this embodiment includes the following steps.

Step 310, a UE receives downlink data which is scheduled by a downlink control channel from a network device, where the downlink control channel is a downlink control channel corresponding to a serving cell, the serving cell is a serving cell of at least two serving cells configured for the UE, and the at least two serving cells include one primary serving cell and at least one secondary serving cell.

It should be noted that, in embodiments of the present invention, the downlink control channel includes PDCCH and/or ePDCCH, this application will be described by taking the PDCCH as an example, and the implementation of the ePDCCH is the same as that of the PDCCH.

Where, one downlink control channel may correspond to one serving cell.

After being configured with at least two serving cells, the UE can obtain the configuration information in the at least two serving cells configured by the network device.

Where, the UE may obtain, through an RRC signaling, the configuration information in the at least two serving cells configured by the network device. For example, the UE initially accesses from the primary serving cell, and then the network device detects that the data requirement of the UE increases, and further adds one secondary serving cell for the UE through the RRC signaling. Here is only one example of configuring two serving cells, embodiments of the present invention are not limited to this, any method for configuring at least two serving cells may be used in embodiments of the present invention.

One serving cell may include a downlink carrier and a uplink carrier corresponding to this downlink carrier, therefore, a pair of uplink carrier and downlink carrier is also called a serving cell, the serving cell and the carrier are not distinguished in this application.

Moreover, this embodiment will be described by taking two serving cells as an example, that is, one primary serving cell and one secondary serving cell, but embodiments of the present invention are not limited to two serving cells. The same method can be adopted if there are more secondary serving cells. Where, the primary serving cell and the secondary serving cell may also be a general first cell and a second cell, which are not limited.

Moreover, the at least two serving cells in this embodiment may work at different frequency points, and may also work at same frequency point, it is the same below.

Step 320, select identity information according to the downlink control channel.

Where, the identity information is used for generating the physical uplink control channel corresponding to the downlink control channel Where, different identity information is selected for different serving cells.

For example, this step may include:

in one embodiment, if the UE receives only the downlink data scheduled by the downlink control channel corresponding to the secondary serving cell, without receiving the downlink data scheduled by the downlink control channel corresponding to the primary serving cell, the UE selects second identity information; and/or, if the downlink data received by the UE includes the downlink data scheduled by the downlink control channel corresponding to the primary serving cell, that is, the UE receives only the downlink data scheduled by the downlink control channel corresponding to the primary serving cell, or the UE simultaneously receives the downlink data scheduled by the downlink control channels corresponding to the primary serving cell and one or more secondary serving cells, the UE selects first identity information.

Further, the first identity information may be the cell identity information corresponding to the primary serving cell.

If the UE receives only the downlink data scheduled by the downlink control channel corresponding to one secondary serving cell, the second identity information may be the cell identity information corresponding to the one secondary serving cell; or If the UE receives only the downlink data scheduled by the downlink control channels corresponding to multiple secondary serving cells in the at least one serving cell, the step of selecting the second identity information by the UE includes: selecting, by the UE, the second identity information according to the predefined rule.

Where, the cell identity information may be a cell identity and/or a virtual cell identity.

In another embodiment, if the downlink data received by the UE includes only the downlink data scheduled by the downlink control channel corresponding to the primary serving cell, but the downlink data scheduled by the downlink control channel corresponding to the secondary serving cell is not received, the selected identity information is the first identity information; and/or, if the downlink data received by the UE includes the downlink data scheduled by the downlink control channel corresponding to the secondary serving cell, that is, the downlink data received by the UE includes only the downlink data scheduled by the downlink control channel corresponding to the secondary serving cell, or the UE simultaneously receives the downlink data scheduled by the downlink control channels corresponding to the primary serving cell and the secondary serving cell, the selected identity information is the second identity information.

Further, the first identity information may be the cell identity information corresponding to the primary serving cell.

If the UE receives the downlink data scheduled by the downlink control channels corresponding to the primary serving cell and only one secondary serving cell, the second identity information may be the cell identity information corresponding to the one secondary serving cell; or if the UE receives only the downlink data scheduled by the downlink control channels corresponding to multiple secondary serving cells in the at least one serving cell, the step of selecting the second identity information by the UE includes: selecting, by the UE, the second identity information according to the predefined rule.

Where, the cell identity information may be a cell identity and/or a virtual cell identity.

Specifically, the cell identity corresponding to the serving cell in this embodiment may be a physical cell identity corresponding to the synchronizing signal of this serving cell, the virtual cell identity of the serving cell may be an identity X which is configured for the UE through the RRC signaling by the network device, the value range of this identity X may be the same as that of the abovementioned physical cell identity, such as an integer from 0 to 503.

In an example, the first cell identity information and the second cell identity information may be the cell identity of the primary serving cell and the cell identity of the secondary serving cell, respectively. Assuming that the UE accesses the LTE system through the primary serving cell, the UE may obtain the cell identity of the primary serving cell by detecting the synchronizing channel of the primary serving cell; thereafter the network device adds one secondary serving cell, such as the carrier f2 of the micro base station, for the UE through the RRC signaling, then the network device transmits the cell identity of the secondary serving cell to the UE through the RRC signaling, or the UE may obtain the cell identity by detecting the synchronizing channel of this secondary serving cell.

Figure 3A:
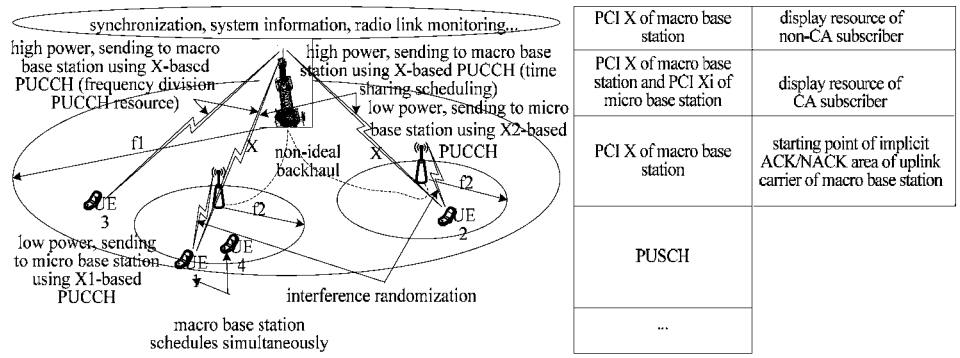
FIG. 3a is a schematic diagram of downlink scheduling and uplink PUCCH resource in carrier aggregation with non-ideal backhaul.

In another example, the second cell identity information may be a virtual cell identity, the first cell identity information may be a cell identity, and may also be a virtual cell identity. This example will be described by taking that the second cell identity information is a virtual cell identity as an example. As shown in FIG. 3a, assuming that the cell identity corresponding to the primary serving cell is the identity X; there are multiple micro base stations (the carrier is f2) in the coverage range of the macro base station, if the cell identities corresponding to these micro base stations are the same (certainly, they may also be different), the network device may configure virtual cell identities corresponding to these micro base stations for the UE, i.e., the second cell identity information, so that the interference among multiple micro base stations is randomized. Where, the network device may configure the virtual cell identity to the UE through the RRC signaling, assuming that the virtual cell identity is Xi, where i is the label of each micro base station.

It should be noted that the identity information in embodiments of the present invention is not limited to the above examples, the identity information may also be the information of the identity configured for the UE by the network device, where the identity may be different for different serving cells, for example, the primary serving cell corresponds to one identity, and the secondary serving cell corresponds to one identity. Certainly, the identity information may also be other identity information, as long as the serving cells can be distinguished.

Step 330, the UE generates the physical uplink control channel corresponding to the downlink data by using the selected identity information.

After the network device configures a primary serving cell and an secondary serving cell for the UE, the UE should monitor the downlink control channels of these two serving cells, respectively, so as to receive the downlink data through these two serving cells. This embodiment will be described by taking that the downlink control channel is the PDCCH as an example, certainly, the downlink control channel may also be the ePDCCH based on a UE specific reference signal. It is assumed that the primary serving cell of the macro base station and one secondary serving cell of the micro base station schedule the UE independently, there will be following several situations:

1) the UE receives only the PDCCH of the primary serving cell;

2) the UE receives only the PDCCH of the secondary serving cell;

3) the UE receives the PDCCH of the primary serving cell and the PDCCH of the secondary serving cell simultaneously.

If the UE can only transmit the PUCCH on one uplink carrier at a certain time, for example, the UE can only transmit the PUCCH on the uplink carrier corresponding to the primary serving cell at a certain time, or, the UE can only transmit the PUCCH on the uplink carrier corresponding to the secondary serving cell at a time, or the UE can only transmit the PUCCH on the uplink carrier corresponding to the primary serving cell at certain times, and transmit the PUCCH on the uplink carrier corresponding to the secondary serving cell at the other times, etc.;

Then the above situation 1) may be that only the macro base station schedules the UE, at the moment, only the macro base station needs to receive the PUCCH, the situation 2) may be that no macro base station schedules the UE, only the micro base station needs to receive the PUCCH, under the situation 3), two base stations both need to receive the PUCCH. For the situation 3), considering that the UE is generally farther from the macro base station than from the micro base station, the power used when the UE transmits the PUCCH needs to satisfy that the PUCCH can be received by the macro base station. In order not to affect other UEs (such as the single carrier UE3 shown in FIG. 3a) served by the macro service station, in embodiments of the present invention, the UE will generate the base sequence of the PUCCH by using the cell identity X of the macro base station. Since the base sequence corresponding to the primary serving cell is generated from the same cell identity X, the base sequence used by the UE served by the macro base station when transmitting the PUCCH to the macro base station is the same, thereby the PUCCH transmitted to the macro service station by all UEs served by the macro base station can be orthogonal, so there is no interference on the PUCCH transmitted to the macro base station by each UE. Or, for the situation 3), the UE may also transmit the PUCCH to the micro base station, now assuming that the backhaul condition between the macro base station and the micro base station is ideal, the PUCCH is transmitted to the micro base station to save the UE power and the PUCCH is unload on the uplink carrier of the micro base station, then now the PUCCH needs to be generated by using the cell identity Xi. Similarly, for the situation 1), the UE also needs to generate the PUCCH by using X. But for the situation 2), the UE needs to generate corresponding PUCCH by using the cell identity or the virtual cell identity Xi of the micro base station, thus different Xi of respective micro base station is used to achieve the interference randomization when multiple micro base stations use the same PUCCH channel resource, and the interference randomization among UEs which transmit the PUCCH may also be achieved when the macro base station and the micro base station use the same PUCCH channel resource. For example, as shown in FIG. 3a, if the UE1 and UE2 receive only the PDCCH transmitted by the respective micro base station, the UE1 and UE2 will generate the corresponding PUCCH respectively by using the cell identities X1 and X2 of the respective micro base station, thus the interference randomization in the PUCCH among multiple micro base stations is achieved; or, if the UE1 receives the PDCCH of the macro base station, but the UE2 receives only the PDCCH of the micro base station, then the UE1 will generate the PUCCH by using the cell identity X of the macro base station of the UE1, to achieve orthogonalization with other potential PUCCH of the UE which is transmitted to the macro base station, and the UE2 will generate the PUCCH by using the cell identity X2 of the micro base station, thus on the same PUCCH channel resource, the interference randomization in the PUCCH transmitted by the UE1 with larger power and the PUCCH transmitted by the UE2 itself can also be achieved.

Step 340, the UE transmits the physical uplink control channel on a channel resource of the physical uplink control channel.

In this step, after obtaining the PUCCH channel resource and generating the PUCCH, the UE transmits the PUCCH on this channel resource to the network device, that is, the macro base station and/or the micro base station.

By adopting the method of this embodiment, since the physical uplink control channel transmitted by the UE is generated by using corresponding cell identity information, after receiving the physical uplink control channel, the network device which transmits the downlink control channel to the UE can distinguish the corresponding physical uplink control channel according to the identity information which is used, it achieves that the same PUCCH channel resource is reused among multiple network devices, without the need for learning in real time the scheduling condition of the downlink data of other base stations, thereby achieving the cell splitting gain, and improving the use of the PUCCH channel resource. Meanwhile, since the physical uplink control channel is generated by using the corresponding cell identity information, the interference randomization in the PUCCH is also achieved.

Moreover, if the network device configures multiple secondary serving cells for the UE, the UE selects the second cell identity information according to the predefined rule. There may be multiple predefined rules in this embodiment.

For example, the UE selects the cell identity information corresponding to any secondary serving cell of the multiple secondary serving cells as the second cell identity information, at this time, the secondary serving base station which transmits the downlink data detects the PUCCH by using all cell identity information which may be used.

For another example, the UE selects the cell identity information which is notified by the network device corresponding to the primary serving cell as the second identity information.

For another example, the UE selects the common cell identity information corresponding to the at least one secondary serving cell as the second identity information. The common cell identity information may be a virtual cell identity which is transmitted to the UE by the network device, even if there are scheduling of multiple secondary serving cells, or if the cell identities corresponding to these micro base stations are the same, the common cell identity information may also be the same cell identity corresponding to these micro base stations, etc., embodiments of the present invention are not limited to these manners, the common cell identity information may also be other common cell identities.

Certainly, embodiments of the present invention are not limited to this, the predefined rules may also be other predefined rules.

In the above embodiment, there may be many kinds of channel resources of the physical uplink control channel corresponding to the downlink data.

In an implementation, if the UE receives the PDCCH corresponding to the primary serving cell and/or the PDCCH corresponding to the secondary serving cell, one or one group of PUCCH channel resources which are notified by the network device or pre-stored are used to feed back the PUCCH. In this case, whether the UE receives the downlink data scheduled by the PDCCH corresponding to the primary serving cell or receives the downlink data scheduled by the PDCCH corresponding to the secondary serving cell, or receives the both, the UE uses one PUCCH channel resource or one group of PUCCH channel resources which are notified by the network device corresponding to the primary serving cell. The one PUCCH channel resource or the one group of PUCCH channel resources may also be notified by the network device corresponding to the secondary serving cell. Where, the one PUCCH channel resource or the one group of PUCCH channel resources which are pre-stored may be one PUCCH channel resource or one group of PUCCH channel resources which are pre-stored after the one PUCCH channel resource or the one group of PUCCH channel resources notified by the network device are received. Embodiments below are the same.

The one PUCCH channel resource or the one group of PUCCH channel resources are semi-statically configured for the UE by the network device. Specifically, the network device may notify the one PUCCH channel resource or the one group of PUCCH channel resources to the UE through the RRC signaling. Where, for the feedback mode of PUCCH format 3, the PUCCH channel resource is one channel resource of PUCCH format 3; for the feedback mode of PUCCH format 1b in combination with channel selection, the PUCCH channel resource is one group of channel resources of PUCCH format 1b in the PUCCH format 1b channel resources for channel selection, for example, for the level M channel selection, the one group of channel resources include M channel resources of PUCCH format 1b, the M may take the value of 2, 3 or 4, where, the value of the M specifically depends on the transmission mode of the downlink data corresponding to the serving cell, for the time division duplexing (TDD) system, the value of the M also depends on the number of downlink sub-frames in one binding window. Reserving one PUCCH channel resource or one group of PUCCH channel resources makes the implementation relatively simple, and the number of channel resources blindly detected by the network device is relatively few.

In another implementation, if the UE receives only the downlink data scheduled by the downlink control channel corresponding to the primary serving cell, then the channel resource is the first channel resource; and/or, if the downlink data received by the UE includes the downlink data scheduled by the downlink control channel corresponding to the secondary serving cell, then the channel resource is the second channel resource. Where the first channel resource is the channel resource of the physical uplink control channel which implicitly corresponds to the channel resource parameter of the downlink control channel corresponding to the primary serving cell, for example, the first channel resource is the channel resource which is determined according to the CCE index and/or the antenna port number of the downlink control channel, or determined according to the eCCE index and/or the antenna port number of the downlink control channel; the second channel resource is one channel resource or one group of channel resources of the physical uplink control channel which are notified by the network device corresponding to the primary serving cell.

In another implementation, if the UE receives only the downlink data scheduled by the downlink control channel corresponding to one secondary serving cell in the at least one secondary serving cell, the channel resource is the first channel resource; and/or, if the downlink data received by the UE includes the downlink data scheduled by the downlink control channel corresponding to the primary serving cell, or the downlink data received by the UE includes the downlink data scheduled by the downlink control channels corresponding to multiple secondary serving cells in the at least one secondary serving cell, the channel resource is the second channel resource;

where, the second channel resource is one channel resource or one group of channel resources of the physical uplink control channel which are notified by the network device corresponding to the primary serving cell; the first channel resource is the channel resource of the physical uplink control channel which implicitly corresponds to the channel resource parameter of the downlink control channel corresponding to the one secondary serving cell, or, if the second channel resource is one group of channel resources, the first channel resource is one channel resource in the one group of channel resources.

In another implementation, if the UE receives only the downlink data scheduled by the downlink control channel corresponding to the primary serving cell, the channel resource is the first channel resource; where the first channel resource is the channel resource which implicitly corresponds to the channel resource parameter of the downlink control channel corresponding to the primary serving cell; or if the downlink data received by the UE includes the downlink data scheduled by the downlink control channels corresponding to multiple secondary serving cells in the at least one secondary serving cell, or, if the downlink data received by the UE includes the downlink data scheduled by the downlink control channel corresponding to the primary serving cell and the downlink data scheduled by the downlink control channel corresponding to one or more secondary serving cells, the channel resource is the third channel resource; the third channel resource is one channel resource or one group of channel resources of the physical uplink control channel which are notified by the network device corresponding to the primary serving cell; or if the UE receives the downlink data scheduled by the downlink control channel corresponding to one secondary serving cell in the at least one secondary serving cell, the channel resource is the second channel resource, where the second channel resource is the channel resource which implicitly corresponds to the resource parameter of the downlink control channel corresponding to the one secondary serving cell in the at least one secondary serving cell; or if the third channel resource is the one group of channel resources, the second channel resource is one channel resource in the one group of channel resources.

Where, the one channel resource or one group of channel resources may be notified by the network device corresponding to the primary serving cell through the radio resource control (RRC) signaling.

Through the several implementations above, when only the PDCCH of the secondary serving cell is received, the UE does not need to perform channel selection any more, but uses a determined channel resource to feed back the PUCCH, thereby reducing the probability of blindly detecting different channels by the network device, and optimizing the PUCCH performance.

Further, if the downlink data received by the UE includes the downlink data scheduled by the downlink control channel corresponding to the primary serving cell, then the channel resource may be on the uplink carrier corresponding to the primary serving cell. Certainly, the channel resource may also be placed on the uplink carrier corresponding to the secondary serving cell, but there may be scheduling conflict.

If the UE receives only the downlink data scheduled by the downlink control channel corresponding to the secondary serving cell, the channel resource is located on the uplink carrier corresponding to the secondary serving cell.

Similarly, if the UE receives only the downlink data scheduled by the downlink control channel corresponding to the secondary serving cell, the channel resource is located on the uplink carrier corresponding to the secondary serving cell; when the UE simultaneously receives the downlink control channels corresponding to the primary serving cell and the secondary serving cell, then the channel resource may be on the uplink carrier corresponding to the primary serving cell or on the uplink carrier corresponding to the secondary serving cell. Where, if the UE receives only the downlink data scheduled by the downlink control channels corresponding to multiple secondary serving cells, without receiving the downlink data scheduled by the downlink control channel corresponding to the primary serving cell, the uplink carrier may be the uplink carrier corresponding to any secondary serving cell.

Accordingly, if the channel resource is on the uplink carrier corresponding to the primary serving cell, and the UE feeds back the ACK or NACK which corresponds to the downlink data corresponding to the primary serving cell and the ACK or NACK which corresponds to the downlink data corresponding to the secondary serving cell, then the first network device which schedules the primary serving cell and the second network device which schedules the secondary serving cell both need to receive their own ACK or NACK respectively on the uplink carrier.

In another embodiment, if the downlink data received by the UE includes only the downlink data scheduled by the downlink control channels corresponding to the primary serving cell, then the channel resource is born on the uplink carrier corresponding to the primary serving cell; and/or, if the downlink data received by the UE includes the downlink data scheduled by the downlink control channels corresponding to the secondary serving cell, then the channel resource is born on the uplink carrier corresponding to the secondary serving cell.

Further, the generating the physical uplink control channel corresponding to the downlink data by using the selected identity information, may include:

for the feedback mode of format 1b in combination with channel selection, the selected identity information is used to generate the sequence of the physical uplink control channel; and/or for the feedback mode of format 3, the selected identity information is used to generate a cyclic shift pattern of a modulation symbol of the physical uplink control channel and/or the mapping of the orthogonal spreading code.

Specifically, for the feedback mode of format 1b in combination with channel selection, the cell identity or the virtual cell identity is used to generate the base sequence of the PUCCH, and thus the same cell identity corresponds to the same base sequence, different cell identities correspond to different base sequences. The orthogonalization can be achieved between different PUCCH channels generated by using the same base sequence, while it is pseudo-orthogonal between the PUCCHs generated by using different base sequences, therefore, the interference randomization and resource reuse among the PUCCHs can be achieved by using the same PUCCH channel resource and using different base sequences. After the base sequence is determined, the cyclic shift of the frequency domain ZC sequence and the time domain spreading code of the format 1b PUCCH can be determined according to the PUCCH channel resource, thus the PUCCH corresponding to the downlink data is generated.

For the feedback mode of format 3, at first the orthogonal spreading code is determined according to the PUCCH channel, thereafter the spread spectrum is performed on the modulation symbol, and then the cyclic shift is performed on the spread modulation symbol, thereby generating the PUCCH format 3. Where the cyclic shift pattern or rule is determined upon the cell identity or the virtual cell identity, thus, the orthogonalization can be achieved on the PUCCH format 3 channel resources by using different orthogonal spreading codes, while for the PUCCH resources with the same orthogonal spreading code, the cyclic shift may be performed on the spread modulation symbol by adopting different cell identities or virtual cell identities, thus the interference randomization and resource reuse of the PUCCH format 3 channel resources can be achieved.

Moreover, for the ACK or NACK codebook size under the PUCCH format 3 mechanism, i.e. the coding bit of the ACK or NACK, in the prior art, regardless of the condition of the PUCCH which is fed back, it is determined by the UE according to the transmission mode of the downlink data configured on the primary serving cell and the secondary serving cell. Assuming that the number of bits of the ACK or NACK corresponding to the downlink data scheduled by the primary serving cell and the secondary serving cell are both 1, then the ACK or NACK codebook size under the PUCCH format 3 mechanism is 2, even if only the secondary serving cell is scheduled at a certain time, the ACK or NACK codebook size is still 2. However, taking the PUCCH format 3 as an example, if the ACK or NACK codebook size is always determined upon the transmission modes of the downlink data configured on the primary serving cell and the secondary serving cell, the PUCCH needs to be transferred according to the maximum number of bits at each time. Since the macro base station mainly provides system information and control information such as the mobility management etc., the scheduling chance of the macro base station is relatively little, while a large number of scheduling chances will occur on the micro base station. Thus, under the CA scenario between the macro base station and the micro base station, transferring the PUCCH by using the maximum number of bits will cause low transmission efficiency, therefore the codebook size design when only the micro base station schedules is optimized in embodiments of the present invention. Specifically, if the feedback mode is of the format 3, as shown in FIG. 3, the method of this embodiment may further include:

step 311, if the downlink data scheduled by the downlink control channel corresponding to the primary serving cell is not received, the UE determines the codebook size of the physical uplink control channel according to the transmission mode of the downlink data scheduled by the downlink control channel corresponding to the secondary serving cell; or, if the downlink data scheduled by the downlink control channel corresponding to the primary serving cell is received, the UE determines the codebook size of the physical uplink control channel according to the transmission modes of the downlink data of the primary serving cell and the secondary serving cell.

As described above, if the UE receives only the downlink data scheduled by the downlink control channel corresponding to the secondary serving cell, the UE determines the codebook size of the PUCCH only according to the transmission mode of the downlink data configured on the secondary serving cell, such a determined codebook size is a small codebook. However, if the UE receives the downlink data scheduled by the downlink control channel corresponding to the primary serving cell, the UE will determine the codebook size of the physical uplink control channel according to the transmission modes of the downlink data configured on the primary serving cell and the secondary serving cell, such a determined codebook size is a large codebook; therefore, the codebook sizes of the PUCCH which is fed back by the UE in these two cases are different, thereby improving the transmission efficiency of the PUCCH. For the case of multiple secondary serving cells, each secondary serving cell is independent; therefore, the determined codebook size is the sum of the codebook sizes corresponding to each transmission mode configured on each secondary serving cell. If the UE receives the downlink data of the primary serving cell and the downlink data of multiple secondary serving cells, the determined codebook size is the sum of the codebook sizes corresponding to the transmission modes configured on the primary serving cell and the multiple secondary serving cells.

It should be noted that, the step 311 may be performed between any two steps after the step 310 and before the step 340.

The network device side may determine different codebook sizes by using different cell identity information, thus, the codebook size design, which is in the case that the UE only receives the downlink scheduling corresponding to the secondary serving cell, is optimized, thereby improving the performance of receiving the ACK or NACK.

Further, in the step 340, the UE transmits the physical uplink control channel on the channel resource, which may include:

the UE determines the transmit power of the physical uplink control channel according to the path loss and the transmit power control (TPC) command in the downlink control channel, and transmits the physical uplink control channel by using the determined transmit power.

Specifically, in an embodiment, if the downlink data received by the UE does not include the downlink data scheduled by the downlink control channel of the primary serving cell, the TPC command is a TPC command in the downlink control channel of one secondary serving cell which corresponds to the downlink data, or a TPC command in the downlink control channel of one secondary serving cell of multiple secondary serving cells which correspond to the downlink data; or, if the downlink data received by the UE includes the downlink data scheduled by the downlink control channel of the primary serving cell, the TPC command is a TPC command in the downlink control channel of the primary serving cell.

In another embodiment, if the downlink data received by the UE includes only the downlink data scheduled by the downlink control channel of the primary serving cell, the TPC command is a TPC command in the downlink control channel of the primary serving cell; or, if the downlink data received by the UE includes the downlink data scheduled by the downlink control channel of the secondary serving cell, the TPC command is a TPC command in the downlink control channel of one secondary serving cell which corresponds to the downlink data, or a TPC command in the downlink control channel of one secondary serving cell of multiple secondary serving cells which correspond to the downlink data.

Where, the path loss may be a predefined value.

Or, specifically, in an embodiment, if the UE receives only the downlink data scheduled by the downlink control channel corresponding to the secondary serving cell, the path loss is the first path loss; and/or, if the downlink data received by the UE includes the downlink data scheduled by the downlink control channel corresponding to the primary serving cell, the path loss is the second path loss;

in another embodiment, if the downlink data received by the UE includes only the downlink data scheduled by the downlink control channel corresponding to the primary serving cell, the path loss is the second path loss; or, if the downlink data received by the UE includes the downlink data scheduled by the downlink control channel corresponding to the secondary serving cell, then the path loss is the first path loss.

Where, if the UE transmits the physical uplink control channel on the uplink carrier corresponding to the primary serving cell, then the second path loss is determined through the power of the downlink reference signal transmitted by the primary serving cell and the receive power of the downlink reference signal measured by the UE, where the receive power of the downlink reference signal is the reference signal reference power (RSRP); the first path loss is determined through the power of the downlink reference signal transmitted by the secondary serving cell, the receive power of the downlink reference signal measured by the UE and the power offset;

if the UE transmits the physical uplink control channel on the uplink carrier corresponding to the secondary serving cell, then the second path loss is determined through the power of the downlink reference signal transmitted by the primary serving cell, the receive power of the downlink reference signal measured by the UE and the power offset; the first path loss is determined through the power of the downlink reference signal transmitted by the secondary serving cell and the receive power of the downlink reference signal measured by the UE.

For another embodiment, the value of the TPC command in the downlink control channel of the primary serving cell is the first TPC command value; the value of the transmit power control (TPC) command in the downlink control channel of the secondary serving cell is the second TPC command value, the difference of the first TPC command value and the second TPC command value is the power offset, where the position of the first TPC command value in the value set of the TPC command in the downlink control channel of the primary serving cell is the same as the position of the second TPC command value in the value set of the TPC command in the downlink control channel of the secondary serving cell.

Specifically, in an embodiment, if the downlink data received by the UE does not include the downlink data scheduled by the downlink control channel corresponding to the primary serving cell, the TPC command is the first TPC command, and the path loss value is the first path loss value; and/or, if the downlink data received by the UE includes the downlink data scheduled by the downlink control channel corresponding to the primary serving cell, the TPC command is the second TPC command, and the path loss value is the second path loss value.

In another embodiment, if the downlink data received by the UE includes only the downlink data scheduled by the downlink control channel corresponding to the primary serving cell, the TPC command is the second TPC command, and the path loss value is the second path loss value; and/or, if the downlink data received by the UE includes the downlink data scheduled by the downlink control channel corresponding to the secondary serving cell, the TPC command is the first TPC command, and the path loss value is the first path loss value.

Specifically, the first path loss is determined through the power of the downlink reference signal transmitted by the secondary serving cell and the receive power of the downlink reference signal measured by the UE; the second path loss is determined through the power of the downlink reference signal transmitted by the primary serving cell and the receive power of the downlink reference signal measured by the UE; at least one of the corresponding element values in the value set of the first TPC command is different from that in the value set of the second TPC command, and the difference is a power offset.

For example, assuming that the UE transmits the physical uplink control channel on the uplink carrier corresponding to the primary serving cell, and the value set of the second TPC command is {−1, 0, 1, 3}dB, which shows that if the downlink data received by the UE includes the downlink data scheduled by the downlink control channel corresponding to the primary serving cell, the UE may determine the PUCCH transmit power by using the second path loss and a certain value in the value set of the second TPC command; the value set of the first command may be {−3, 0, 1, 6}dB, it can be seen that two values are different from those of the corresponding elements in the value set of the second TPC command, of course, other values are not excluded, the difference between the corresponding values can be seen as a power offset to compensate the power difference of the path loss caused at the frequency point where the primary serving cell and the secondary serving cell are located.

In embodiments of the present invention, the power offset may be the power difference of the path loss caused at the frequency point where the primary serving cell and the secondary serving cell are located, but it is not limited to this, the power offset may also be a power offset which is set according to other requirements.

By adopting the above solution, in the case that the UE is much closer to the micro cell than to the macro cell, it can be ensured that the physical uplink control channel is only transmitted to the micro cell, the transmit power is calculated by using the path loss and the TPC command of the micro cell, thus the transmit power will be lower than the transmit power of transmitting to the macro cell. Therefore, this solution can improve power efficiency by transmitting the physical uplink control channel to different transmitting points according to their respective power, and reduce the interference with other UEs and base stations.

Step 350, if the network device corresponding to the primary serving cell transmits the downlink data to the UE, the network device corresponding to the primary serving cell detects, by using the identity information corresponding to the primary serving cell, the physical uplink control channel corresponding to the downlink data on the channel resource which is allocated for the UE for feeding back the physical uplink control channel, where the physical uplink control channel is generated by the UE using the identity information corresponding to the primary serving cell. Or, if the downlink control channel is the downlink control channel corresponding to the primary serving cell which corresponds to the network side equipment, the network device detects the first physical uplink control channel by using the first identity, the network device detects the second physical uplink control channel by using the second identity, the information codebook size contained in the first physical uplink control channel is determined according to the downlink data of the primary serving cell, the information codebook size contained in the second physical uplink control channel is determined according to the downlink data of the primary serving cell and the secondary serving cell, where the first identity is the cell identity information corresponding to the primary serving cell, and the second identity is the cell identity information corresponding to the secondary serving cell.

Further, before the step 340, the method may further include:

Step 331, the network device of the primary serving cell notifies one channel resource or one group of channel resources of the physical uplink control channel to the UE and the network devices corresponding to all secondary serving cells configured for the UE.

Where, the step 331 may be performed before any step which is before the step 340, the execution time is not limited in embodiments of the present invention. Where, it can be notified through RRC signaling.

Where, the network devices in all embodiments of the present invention may be a network device such as a base station or a radio network controller.

Specifically, the detecting the physical uplink control channel corresponding to the downlink data, includes:

detecting, by using the cell identity information, the physical uplink control channel corresponding to the downlink data on the one channel resource or the one group of channel resources and on the channel resource of the physical uplink control channel which implicitly corresponds to the downlink control channel.

Further, the detecting the physical uplink control channel corresponding to the downlink data, includes:

detecting the physical uplink control channel corresponding to the downlink data on the uplink carrier corresponding to the primary serving cell.

Step 360, if the network device corresponding to the secondary serving cell transmits the downlink data to the UE, the network device corresponding to the secondary serving cell detects, by using the cell identity information which may be used, the physical uplink control channel corresponding to the downlink data on the channel resource for feeding back the physical uplink control channel, where the physical uplink control channel is generated by the UE by using one cell identity information of the cell identity information which may be used. Or, if the downlink control channel is the downlink control channel corresponding to the secondary serving cell which corresponds to the network device, the network device detects the first physical uplink control channel by using the first identity, the network device detects the second physical uplink control channel by using the second identity, the information codebook size contained in the first physical uplink control channel is determined according to the downlink data of the primary serving cell and the secondary serving cell or according to the downlink data of the secondary serving cell, the information codebook size contained in the second physical uplink control channel is determined according to the downlink data of the primary serving cell and the secondary serving cell, where the first identity is the cell identity information corresponding to the primary serving cell, the second identity is the cell identity information corresponding to the secondary serving cell.

It should be noted that the order of performing the step 350 and the step 360 may be arbitrary, for example, they can be performed simultaneously, and may also be performed successively.

Where, the cell identity information which may be used by the UE includes:

the identity information which may be used by the UE includes the cell identity information corresponding to the primary serving cell, the cell identity information corresponding to the secondary serving cell which corresponds to the network device, and the identity information determined according to the predefined rule; or the identity information which may be used by the UE includes the cell identity information corresponding to the primary serving cell and the cell identity information corresponding to all secondary serving cells configured for the UE.

Where the cell identity information determined according to the predefined rule includes:

the cell identity information notified by the network device corresponding to the primary serving cell; or the common cell identity information corresponding to all secondary serving cells configured for the UE, where the common cell identity information may be found in the description of the above embodiments, which will not be repeated here.

Certainly, embodiments of the present invention are not limited to the above predefined rule.

In the step 360, detecting the physical uplink control channel corresponding to the downlink data may include: detecting, by using the cell identity information which may be used, the physical uplink control channel corresponding to the downlink data on the channel resource or the group of channel resources corresponding to the information; or in the step 360, the detecting the physical uplink control channel corresponding to the downlink data may include: detecting, by using the identity information which may be used, the physical uplink control channel corresponding to the downlink data on the channel resource or the group of channel resources corresponding to the information of the one channel resource or the one group of channel resources and on the channel resource of the physical uplink control channel corresponding to the downlink control channel.

In one implementation, the obtaining the information of the one channel resource or the one group of channel resources of the physical uplink control channel, may include: obtaining the information of the one channel resource or the one group of channel resources through the RRC signaling.

In another implementation, before the obtaining the one channel resource or the one group of channel resources of the physical uplink control channel, the method may further include: receiving the information of the one channel resource or the one group of channel resources through the RRC signaling, and storing the information of the one channel resource or the one group of channel resources;

the obtaining the information of one channel resource or one group of channel resources of the physical uplink control channel, may include: obtaining the stored information.

By adopting the method of this embodiment, since the physical uplink control channel transmitted by the UE is generated by using corresponding cell identity information, after receiving the physical uplink control channel, the network device corresponding to the primary serving cell which transmits the downlink control channel to the UE can distinguish the corresponding physical uplink control channel according to the cell identity information, it achieves that the same PUCCH channel resource is reused among multiple network devices, without the need for learning in real time the scheduling condition of the PUCCH channel resource of other eNB, thereby achieving the cell splitting gain, and improving the use of the PUCCH channel resource. Meanwhile, through the above embodiments, the probability of blindly detecting different channels by the base station corresponding to the secondary serving cell is reduced, and the PUCCH performance can be optimized.

Figure 4:
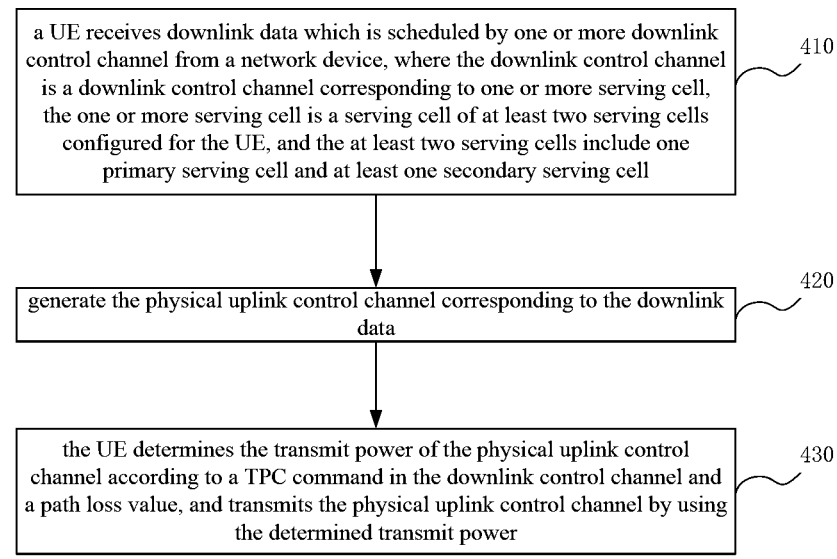
FIG. 4 is a flowchart of a method for transmitting uplink control information according to another embodiment of the present invention.

Another embodiment of the present invention provides a method for transmitting an uplink control channel, as shown in FIG. 4, the method includes the following steps.

Step 410, a UE receives downlink data which is scheduled by one or more downlink control channel from a network device, where the downlink control channel is a downlink control channel corresponding to one or more serving cell, the one or more serving cell is a serving cell of at least two serving cells configured for the UE, and the at least two serving cells include one primary serving cell and at least one secondary serving cell.

Step 420, generate the physical uplink control channel corresponding to the downlink data.

Where, the specific implementations of the step 410 and step 420 may be found in the description of the above embodiments, which will not be repeated here.

Step 430, the UE determines the transmit power of the physical uplink control channel according to a TPC command in the downlink control channel and a path loss value, and transmits the physical uplink control channel by using the determined transmit power.

Specifically, in an embodiment, if the UE receives only the downlink data scheduled by the downlink control channel of the secondary serving cell, without receiving the downlink data scheduled by the downlink control channel of the primary serving cell, the transmit power of the PUCCH is determined by using the TPC command in the downlink control channel of the secondary serving cell and the path loss; and/or, if the downlink data received by the UE includes the downlink data scheduled by the downlink control channel of the primary serving cell, the transmit power of the PUCCH is determined by using the TPC command in the downlink control channel of the primary serving cell and the path loss.

In another embodiment, if the UE receives the downlink data scheduled by the downlink control channel of the secondary serving cell, with or without receiving the downlink data scheduled by the downlink control channel of the primary serving cell, the transmit power of the PUCCH is determined by using the TPC command in the downlink control channel of the secondary serving cell and the path loss; and/or, if the downlink data received by the UE includes only the downlink data scheduled by the downlink control channel of the primary serving cell, the transmit power of the PUCCH is determined by using the TPC command in the downlink control channel of the primary serving cell and the path loss.

Where, if only the downlink data scheduled by the downlink control channel of multiple secondary serving cells is received, and the downlink data scheduled by the downlink control channel of the primary serving cell is not received, the transmit power of the PUCCH may be determined by using the TPC command in the downlink control channel of any secondary serving cell and the path loss.

Further, in an embodiment, if the UE receives only the downlink data scheduled by the downlink control channel corresponding to the secondary serving cell, the path loss value is the first path loss value; and/or, if the downlink data received by the UE includes the downlink data scheduled by the downlink control channel corresponding to the primary serving cell, then the path loss value is the second path loss value; in another embodiment, if the UE receives the downlink data scheduled by the downlink control channel corresponding to the secondary serving cell, the path loss value is the first path loss value; and/or, if the downlink data received by the UE includes only the downlink data scheduled by the downlink control channel corresponding to the primary serving cell, then the path loss value is the second path loss value.

Specifically, if the UE transmits the physical uplink control channel on the uplink carrier corresponding to the primary serving cell, then the second path loss is determined through the power of the downlink reference signal transmitted by the primary serving cell and the receive power of the downlink reference signal measured by the UE, where the receive power of the downlink reference signal is the reference signal reference power (RSRP); the first path loss is determined through the power of the downlink reference signal transmitted by the secondary serving cell, the receive power of the downlink reference signal measured by the UE and the power offset;

if the UE transmits the physical uplink control channel on the uplink carrier corresponding to the secondary serving cell, then the second path loss is determined through the power of the downlink reference signal transmitted by the primary serving cell, the receive power of the downlink reference signal measured by the UE and the power offset; the first path loss is determined through the power of the downlink reference signal transmitted by the secondary serving cell and the receive power of the downlink reference signal measured by the UE.

For another embodiment, the value of the TPC command in the downlink control channel of the primary serving cell is the first TPC command value; the value of the transmit power control (TPC) command in the downlink control channel of the secondary serving cell is the second TPC command value, the difference of the first TPC command value and the second TPC command value is the power offset, where the position of the first TPC command value in the value set of the TPC command in the downlink control channel of the primary serving cell is the same as the position of the second TPC command value in the value set of the TPC command in the downlink control channel of the secondary serving cell.

Specifically, in an embodiment, if the downlink data received by the UE does not include the downlink data scheduled by the downlink control channel corresponding to the primary serving cell, the TPC command is the first TPC command, and the path loss value is the first path loss value; and/or, if the downlink data received by the UE includes the downlink data scheduled by the downlink control channel corresponding to the primary serving cell, the TPC command is the second TPC command, and the path loss is the second path loss. In another embodiment, if the downlink data received by the UE includes only the downlink data scheduled by the downlink control channel corresponding to the primary serving cell, the TPC command is the second TPC command, and the path loss value is the second path loss value; and/or, if the downlink data received by the UE includes the downlink data scheduled by the downlink control channel corresponding to the secondary serving cell, the TPC command is the first TPC command, and the path loss value is the first path loss value.

Specifically, the first path loss is determined through the power of the downlink reference signal transmitted by the secondary serving cell and the receive power of the downlink reference signal measured by the UE; the second path loss is determined through the power of the downlink reference signal transmitted by the primary serving cell and the receive power of the downlink reference signal measured by the UE; at least one of the corresponding element values in the value set of the first TPC command is different from that in the value set of the second TPC command, and the difference is a power offset.

For example, assuming that the UE transmits the physical uplink control channel on the uplink carrier corresponding to the primary serving cell, and the value set of the second TPC command is {−1, 0, 1, 3}dB, which shows that if the downlink data received by the UE includes the downlink data scheduled by the downlink control channel corresponding to the primary serving cell, the UE may determine the PUCCH transmit power by using the second path loss and a certain value in the value set of the second TPC command; the value set of the first command may be {−3, 0, 1, 6}dB, it can be seen that two values are different from those of the corresponding elements in the value set of the second TPC command, of course, other values are not excluded, the difference between the corresponding values can be seen as a power offset to compensate the power difference of the path loss caused at the frequency point where the primary serving cell and the secondary serving cell are located.

In embodiments of the present invention, the power offset may be the power difference of the path loss caused at the frequency point where the primary serving cell and the secondary serving cell are located, but it is not limited to this, and the power offset may also be a power offset which is set according to other requirements.

By adopting the above solution, in the case that the UE is much closer to the micro cell than to the macro cell, it can be ensured that the physical uplink control channel is only transmitted to the micro cell, the transmit power is calculated by using the path loss and the TPC command of the micro cell, thus the transmit power will be lower than the transmit power of transmitting to the macro cell. Therefore, this solution can improve power efficiency by transmitting the physical uplink control channel to different transmitting points according to their respective power, and reduce the interference with other UEs and base stations.

Figure 5:
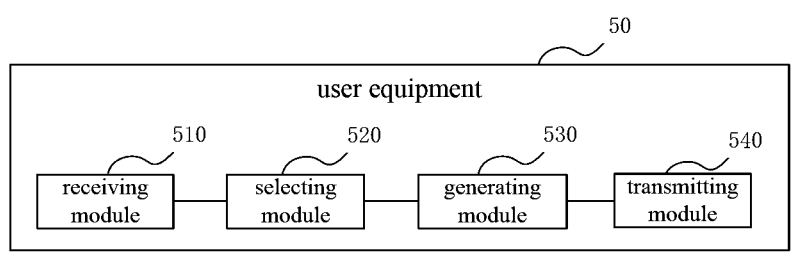
FIG. 5 is a schematic structural diagram of a user equipment according to an embodiment of the present invention.

An embodiment of the present invention provides a user equipment 50, this embodiment can perform the steps of the method in the above embodiments. This embodiment gives only simple description of the structure of the user equipment 50, the specific implementation may be found in the description of the above embodiments. As shown in FIG. 5, the user equipment 50 of this embodiment includes a receiving module 510, a selecting module 520, a generating module 530, and a transmitting module 540.

The receiving module 510 is configured to receive downlink data which is scheduled by the downlink control channel from a network device, where the downlink control channel is a downlink control channel corresponding to a serving cell, the serving cell is a serving cell of at least two serving cells configured for the UE, the at least two serving cells include one primary serving cell and at least one secondary serving cell;

the selecting module 520 is configured to select identity information according to the downlink control channel corresponding to the downlink data received by the receiving module 510;

the generating module 530 is configured to generate the physical uplink control channel corresponding to the downlink data by using the identity information selected by the selecting module 520; and the transmitting module 540 is configured to transmit the physical uplink control channel on a channel resource of the physical uplink control channel generated by the generating module 530.

Since this embodiment performs the method of the above embodiments, the technical effect which can be obtained by this embodiment can be found in the description of the above embodiments, which will not be repeated here.

Where, in an embodiment, the selecting module 520 is specifically configured to, if the downlink data received by the receiving module 510 does not include downlink data scheduled by the downlink control channel corresponding to the primary serving cell, select second identity information; the generating module 530 is specifically configured to generate the physical uplink control channel corresponding to the downlink data by using the second identity information; or, if the downlink data received by the receiving module 510 includes the downlink data scheduled by the downlink control channel corresponding to the primary serving cell, select first identity information; the generating module 530 is specifically configured to generate the physical uplink control channel corresponding to the downlink data by using the first identity information.

Where, the selecting module 520 is specifically configured to select cell identity information corresponding to the primary serving cell as the first identity information; or the selecting module 520 is specifically configured to, if the receiving module 510 receives only downlink data scheduled by the downlink control channel corresponding to one secondary serving cell, select cell identity information corresponding to the one secondary serving cell as the second identity information; or, if the receiving module 510 receives only downlink data scheduled by downlink control channels corresponding to multiple secondary serving cells in the at least one secondary serving cell, select the second identity information according to the predefined rule.

In another embodiment, the selecting module 520 is specifically configured to, if the downlink data received by the receiving module 510 includes only downlink data scheduled by the downlink control channel corresponding to the primary serving cell, select the first identity information; the generating module 530 is specifically configured to generate the physical uplink control channel corresponding to the downlink data by using the first identity information; and/or the selecting module 520 is specifically configured to, if the downlink data received by the receiving module 510 includes downlink data scheduled by the downlink control channel corresponding to the secondary serving cell, select the second identity information; the generating module 530 is specifically configured to generate the physical uplink control channel corresponding to the downlink data by using the second identity information.

In the another embodiment above, the selecting module 520 is specifically configured to select the cell identity information corresponding to the primary serving cell as the first identity information; or the selecting module 520 is specifically configured to, if the receiving module 510 receives the downlink data scheduled by downlink control channels corresponding to the primary serving cell and only one secondary serving cell, select the cell identity information corresponding to the one secondary serving cell as the second identity information; or the selecting module 520 is specifically configured to, if the receiving module receives only the downlink data scheduled by downlink control channels corresponding to multiple secondary serving cells in the at least one secondary serving cell, select the second identity information according to the predefined rule.

Where, the selecting module 520 is specifically configured to select the second identity information according to the predefined rule in a following way: select the cell identity information corresponding to any one secondary serving cell of the multiple secondary serving cells as the second identity information; or, select the cell identity information which is notified by a network device corresponding to the primary serving cell as the second identity information; or select the common cell identity information corresponding to the at least one secondary serving cell as the second identity information.

Specifically, the selecting module 520 may be specifically configured to select the cell identity information in a following way: select a cell identity and/or a virtual cell identity as the cell identity information.

Figure 6:
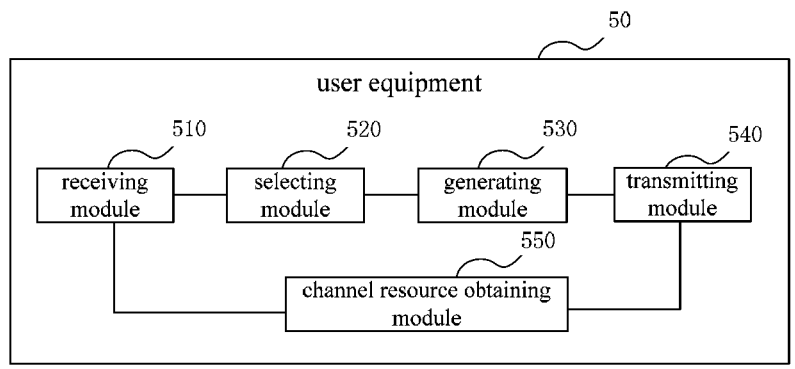
FIG. 6 is a schematic structural diagram of a user equipment according to another embodiment of the present invention.

Further, as shown in FIG. 6, the user equipment may further include a channel resource obtaining module 550.

In a first implementation, the channel resource obtaining module 550 is configured to obtain information of one channel resource or one group of channel resources of the physical uplink control channel; the transmitting module 540 is specifically configured to transmit the physical uplink control channel on the channel resource of the physical uplink control channel in a following way: transmit the physical uplink control channel generated by the generating module 530 on the one channel resource or the one group of channel resources corresponding to the information of the one channel resource or the one group of channel resources, where the information is obtained by the channel resource obtaining module 550.

In a second implementation, the channel resource obtaining module 550 is configured to determine that the serving cell corresponding to the downlink data received by the receiving module 510 is the primary serving cell, and obtain a channel resource parameter of the downlink control channel corresponding to the primary serving cell; the transmitting module 540 is specifically configured to transmit the physical uplink control channel on the channel resource of the physical uplink control channel in a following way: transmit the physical uplink control channel generated by the generating module 530 on the first channel resource corresponding to the channel resource parameter obtained by the channel resource obtaining module 550, where the first channel resource is the channel resource of the physical uplink control channel corresponding to the channel resource parameter obtained by the channel resource obtaining module 550; or the channel resource obtaining module 550 is configured to determine that the serving cell corresponding to the downlink data received by the receiving module 510 includes the secondary serving cell, and obtain information of one channel resource or one group of channel resources of the physical uplink control channel; the transmitting module 540 is specifically configured to transmit the physical uplink control channel on the channel resource of the physical uplink control channel in a following way: transmit the physical uplink control channel generated by the generating module 530 on the second channel resource; where the second channel resource is the one channel resource or the one group of channel resources corresponding to the information of the one channel resource or the one group of channel resources, where the information is obtained by the channel resource obtaining module 550.

In a third implementation, the channel resource obtaining module 550 is configured to determine that the serving cell corresponding to the downlink data received by the receiving module 510 is one secondary serving cell in the at least one secondary serving cell, and obtain a channel resource parameter of the downlink control channel corresponding to the one secondary serving cell; the transmitting module 540 is specifically configured to transmit the physical uplink control channel on the channel resource of the physical uplink control channel in a following way: transmit the physical uplink control channel on the third channel resource; where the third channel resource is the channel resource of the physical uplink control channel corresponding to the channel resource parameter obtained by the channel resource obtaining module 550; or the channel resource obtaining module 550 is configured to determine that the serving cell corresponding to the downlink data received by the receiving module 510 includes the primary serving cell and one or more secondary serving cells in the at least one secondary serving cell, or includes multiple secondary serving cells in the at least one secondary serving cell, and obtain information of one channel resource or one group of channel resources of the physical uplink control channel; the transmitting module 540 is specifically configured to transmit the physical uplink control channel on the channel resource of the physical uplink control channel in a following way: transmit the physical uplink control channel on the fourth channel resource, where the fourth channel resource is the one channel resource or the one group of channel resources corresponding to the information of the one channel resource or the one group of channel resources, where the information is obtained by the channel resource obtaining module 550; or the channel resource obtaining module 550 is configured to determine that the serving cell corresponding to the downlink data received by the receiving module 510 is one secondary serving cell in the at least one secondary serving cell, and obtain the information of one channel resource or one group of channel resources of the physical uplink control channel; the transmitting module 540 is specifically configured to transmit the physical uplink control channel on the channel resource of the physical uplink control channel in a following way: transmit the physical uplink control channel on the fifth channel resource; where, if the fourth channel resource is the one group of channel resources obtained by the channel resource obtaining module 550, the fifth channel resource is one channel resource in the one group of channel resources.

In a fourth implementation, the channel resource obtaining module 550 is configured to determine that the serving cell corresponding to the downlink data received by the receiving module 510 is the primary serving cell, and obtain a channel resource parameter of the downlink control channel corresponding to the primary serving cell; the transmitting module 540 is specifically configured to transmit the physical uplink control channel on the channel resource of the physical uplink control channel in a following way: transmit the physical uplink control channel on the first channel resource, where the first channel resource is the channel resource corresponding to the channel resource parameter obtained by the channel resource obtaining module 550; or the channel resource obtaining module 550 is configured to determine that the serving cell corresponding to the downlink data received by the receiving module 510 is one secondary serving cell in the at least one secondary serving cell, and obtain a channel resource parameter of the downlink control channel corresponding to the one secondary serving cell in the at least one secondary serving cell; the transmitting module 540 is specifically configured to transmit the physical uplink control channel on the channel resource of the physical uplink control channel in a following way: transmit the physical uplink control channel on the third channel resource, where the third channel resource is the channel resource of the physical uplink control channel corresponding to the channel resource parameter obtained by the channel resource obtaining module 550; or the channel resource obtaining module 550 is configured to determine that the serving cell corresponding to the downlink data received by the receiving module 510 includes multiple secondary serving cells in the at least one secondary serving cell, or includes the primary serving cell and one or more secondary serving cells in the at least one secondary serving cell, and obtain information of one channel resource or one group of channel resources of the physical uplink control channel; the transmitting module 540 is specifically configured to transmit the physical uplink control channel on the channel resource of the physical uplink control channel in a following way: transmit the physical uplink control channel on the fourth channel resource; where the fourth channel resource is the one channel resource or the one group of channel resources corresponding to the information of the one channel resource or the one group of channel resources, where the information is obtained by the channel resource obtaining module 550; or the channel resource obtaining module 550 is configured to determine that the serving cell corresponding to the downlink data received by the receiving module 510 is one secondary serving cell in the at least one secondary serving cell, and obtain the information of one channel resource or one group of channel resources of the physical uplink control channel; the transmitting module 540 is specifically configured to transmit the physical uplink control channel on the channel resource of the physical uplink control channel in a following way: transmit the physical uplink control channel on the fifth channel resource; where, if the fourth channel resource is the one group of channel resources, the fifth channel resource is one channel resource in the one group of channel resources.

For the above implementations, one way of obtaining the information is:

the receiving module 510 is further configured to receive the information of the one channel resource or the one group of channel resources, where the information is transmitted through the RRC signaling by the network device; the channel resource obtaining module 550 is specifically configured to obtain the information of the one channel resource or the one group of channel resources which is received by the receiving module 310.

Figure 7:
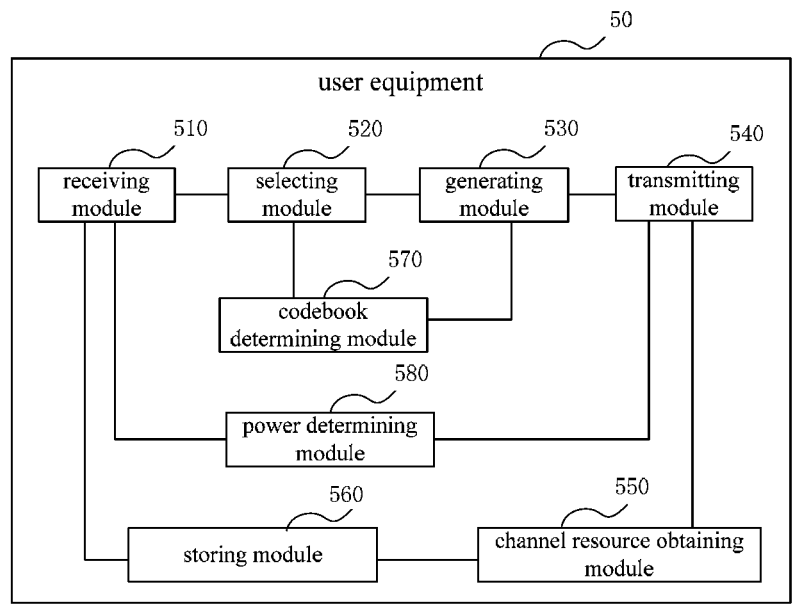
FIG. 7 is a schematic structural diagram of a user equipment according to an embodiment of the present invention.

For the above implementations, another way of obtaining the information is:

as shown in FIG. 7, the user equipment further includes a storing module 560, the storing module 560 is configured to store the information of the one channel resource or the one group of channel resources; the channel resource obtaining module 550 is specifically configured to obtain the information of the one channel resource or the one group of channel resources from the storing module 560.

Further, the transmitting module 540 is specifically configured to transmit the physical uplink control channel generated by the generating module 530 on the channel resource of the physical uplink control channel in a following way:

if the downlink data received by the receiving module 510 includes the downlink data scheduled by the downlink control channel corresponding to the primary serving cell, then bear the channel resource on an uplink carrier corresponding to the primary serving cell and transmit the physical uplink control channel generated by the generating module 530 on the channel resource; or if the receiving module 510 receives only the downlink data scheduled by the downlink control channel corresponding to one of the multiple secondary serving cells, then bear the channel resource on an uplink carrier corresponding to the one secondary serving cell, and transmit the physical uplink control channel generated by the generating module 530 on the channel resource; or if the receiving module 510 receives only the downlink data scheduled by the downlink control channels corresponding to multiple secondary serving cells in the at least one secondary serving cell, then bear the channel resource on an uplink carrier corresponding to one secondary serving cell of the multiple secondary serving cells, and transmit the physical uplink control channel generated by the generating module 530 on the channel resource.

In the another embodiment above, the transmitting module 540 is specifically configured to transmit the physical uplink control channel generated by the generating module 530 on the channel resource of the physical uplink control channel in a following ways: if the downlink data received by the receiving module includes only the downlink data scheduled by the downlink control channel corresponding to the primary serving cell, then bear the channel resource on the uplink carrier corresponding to the primary serving cell; or if the downlink data received by the receiving module includes the downlink data scheduled by the downlink control channel corresponding to the secondary serving cell, then bear the channel resource on an uplink carrier corresponding to the secondary serving cell.

Further, the generating module 530 is specifically configured to generate the physical uplink control channel corresponding to the downlink data by using the selected identity information in a following ways:

for the feedback mode of downlink control channel format 1b in combination with channel selection, generate a sequence of the physical uplink control channel by using the selected identity information; or, for the feedback mode of downlink control channel format 3, generate a cyclic shift pattern of the modulation symbol of the physical uplink control channel by using the selected identity information and/or perform mapping of the orthogonal spreading code by using the selected identity information.

Further, as shown in FIG. 7, the user equipment may further include:

a codebook determining module 570, configured to, for the feedback mode of format 3, if the receiving module 510 does not receive the downlink data scheduled by the downlink control channel corresponding to the primary serving cell, determine the codebook size of the physical uplink control channel according to the transmission mode of the downlink data of the secondary serving cell; or, if the receiving module 510 receives the downlink data scheduled by the downlink control channel corresponding to the primary serving cell, determine the codebook size of the physical uplink control channel according to transmission modes of the downlink data of the primary serving cell and the secondary serving cell;

the generating module 530 is further configured to generate the physical uplink control channel according to the codebook size determined by the codebook determining module 570 and the identity information selected by the selecting module.

In an embodiment, further, the user equipment further includes:

a power determining module 580, configured to determine transmit power of the physical uplink control channel according to a path loss value and a transmit power control (TPC) command in the downlink control channel corresponding to the downlink data received by the receiving module 510; where, if the downlink data received by the receiving module 510 does not include the downlink data scheduled by the downlink control channel of the primary serving cell, the TPC command is the TPC command in the downlink control channel of one secondary serving cell which corresponds to the downlink data or in the downlink control channel of one secondary serving cell of multiple secondary serving cells which correspond to the downlink data; or, if the downlink data received by the receiving module 510 includes the downlink data scheduled by the downlink control channel of the primary serving cell, the TPC command is the TPC command in the downlink control channel of one secondary serving cell which corresponds to the downlink data or in the downlink control channel of one secondary serving cell of multiple secondary serving cells which correspond to the downlink data;

the transmitting module 540 is specifically configured to transmit the physical uplink control channel generated by the generating module 530 in a following way: transmit the physical uplink control channel generated by the generating module 530 using the transmit power determined by the power determining module 580.

Or, in an embodiment, further, the user equipment further includes:

the power determining module 580, configured to, if the downlink data received by the receiving module includes only the downlink data scheduled by the downlink control channel of the primary serving cell, the TPC command is a TPC command in the downlink control channel of the primary serving cell; or, if the downlink data received by the receiving module 510 includes the downlink data scheduled by the downlink control channel of the secondary serving cell, the TPC command is a TPC command in the downlink control channel of one secondary serving cell which corresponds to the downlink data or in the downlink control channel of one secondary serving cell of multiple secondary serving cells which correspond to the downlink data;

the transmitting module 540 is specifically configured to transmit the physical uplink control channel generated by the generating module 530 in a following way: transmit the physical uplink control channel generated by the generating module 530 using the transmit power determined by the power determining module 580.

Further, as shown in FIG. 7, the user equipment further includes a measuring module 590.

The power determining module 580 is further configured to determine the path loss in a following way: if the downlink data received by the receiving module 510 does not include the downlink data scheduled by the downlink control channel corresponding to the primary serving cell, determine that the path loss is first path loss; if the downlink data received by the receiving module 510 includes the downlink data scheduled by the downlink control channel corresponding to the primary serving cell, then the path loss is second path loss; or if the downlink data received by the receiving module includes only the downlink data scheduled by the downlink control channel corresponding to the primary serving cell, the path loss is the second path loss; if the downlink data received by the receiving module 510 includes the downlink data scheduled by the downlink control channel of the secondary serving cell, then the path loss is the first path loss; where, if the transmitting module 540 transmits the physical uplink control channel on the uplink carrier corresponding to the primary serving cell, the receiving module 510 is further configured to receive the downlink reference signal transmitted by the primary serving cell; the measuring module 590 is configured to measure first receive power of the downlink reference signal which is transmitted by the primary serving cell and received by the receiving module 510; the power determining module 580 determines the second path loss according to first transmit power of the downlink reference signal transmitted by the primary serving cell and the first receive power measured by the measuring module 590; the receiving module 510 is further configured to receive the downlink reference signal transmitted by one secondary serving cell in the at least one secondary serving cell; the measuring module 590 is configured to measure second receive power of the downlink reference signal which is transmitted by the one secondary serving cell and received by the receiving module 510; the power determining module 580 determines the first path loss according to second transmit power of the downlink reference signal transmitted by the one secondary serving cell, the second receive power measured by the measuring module 590 and the power offset;

or, if the transmitting module 540 transmits the physical uplink control channel on the uplink carrier corresponding to one secondary serving cell in the at least one secondary serving cell, the receiving module 510 is further configured to receive the downlink reference signal transmitted by the primary serving cell; the measuring module 590 is configured to measure the first receive power of the downlink reference signal which is transmitted by the primary serving cell and received by the receiving module 510; the power determining module 580 determines the second path loss according to the first transmit power of the downlink reference signal transmitted by the primary serving cell, the first receive power measured by the measuring module 590 and the power offset; the receiving module 510 is further configured to receive the downlink reference signal transmitted by one secondary serving cell in the at least one secondary serving cell; the measuring module 590 is configured to measure the second receive power of the downlink reference signal which is transmitted by the one secondary serving cell and received by the receiving module 510; the power determining module 580 determines the first path loss according to the second transmit power of the downlink reference signal transmitted by the one secondary serving cell and the second receive power measured by the measuring module 590.

By adopting the user equipment of this embodiment, it achieves that the same PUCCH channel resource is reused among multiple network devices, without the need for learning in real time the scheduling condition of the PUCCH channel resources of other base stations, thereby achieving the cell splitting gain, and improving the use of the PUCCH channel resource.

Figure 8:
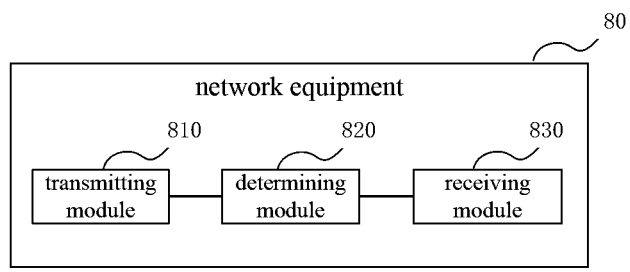
FIG. 8 is a schematic structural diagram of a network device according to an embodiment of the present invention.

An embodiment of the present invention provides a network device 80, this embodiment can perform the steps of the method in the above embodiments. This embodiment gives only simple description of the structure of the network device 80, the specific implementation can be found in the description of the above embodiments. As shown in FIG. 8, the network device 80 of this embodiment includes a transmitting module 810, a determining module 820, and a receiving module 830.

The transmitting module 810 is configured to transmit downlink data scheduled by the downlink control channel to a UE, where the downlink control channel is the downlink control channel corresponding to an secondary serving cell, the secondary serving cell is a serving cell of at least two serving cells configured for the UE, or the downlink control channel is the downlink control channel corresponding to a primary serving cell which corresponds to the network side equipment, the at least two serving cells further include the primary serving cell;

the determining module 820 is configured to determine identity information which may be used by the UE after the transmitting module 810 transmits the downlink data; and the receiving module 830 is configured to, on the channel resource for feeding back the physical uplink control channel, detect the physical uplink control channel corresponding to the downlink data by using the identity information which may be used and is determined by the determining module 820, where the physical uplink control channel is generated by the UE by using one kind of the identity information which may be used by the UE.

Since this embodiment performs the method of the above embodiments, the technical effect which can be obtained by this embodiment can be found in the description of the above embodiments, which will not be repeated here.

The determining module 820 is specifically configured to determine the identity information which may be used by the UE, including: the cell identity information corresponding to the primary serving cell, the cell identity information corresponding to the secondary serving cell which corresponds to the network device, and the identity information determined according to the predefined rule; or the identity information which may be used by the UE includes the cell identity information corresponding to the primary serving cell and the cell identity information corresponding to all secondary serving cells configured for the UE;

where the cell identity information is a cell identity and/or a virtual cell identity.

Further, the determining module 820 is specifically configured to determine the identity information according to the following predefined rule:

the cell identity information notified by the network device corresponding to the primary serving cell, or the common cell identity information corresponding to all secondary serving cells configured for the UE.

Figure 8A:
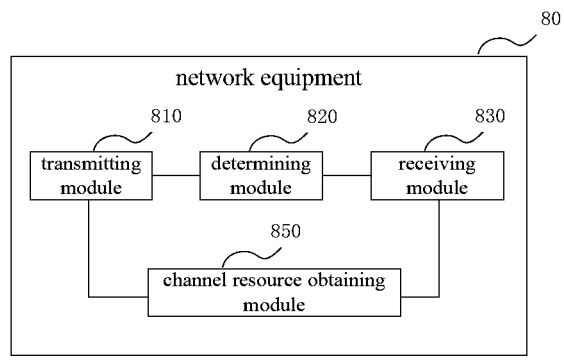
FIG. 8a is a schematic structural diagram of a network device according to another embodiment of the present invention.

Further, as shown in FIG. 8a, the network device may further include:

a channel resource obtaining module 850, configured to obtain information of one channel resource or one group of channel resources of the physical uplink control channel, and obtain a channel resource parameter of the downlink control channel corresponding to the downlink data transmitted by the transmitting module 810;

the receiving module 830 is specifically configured to detect the physical uplink control channel corresponding to the downlink data by using the identity information which may be used and is determined by the determining module 820 in a following way: detect, by using the identity information which may be used and is determined by the determining module 820, a physical uplink control channel corresponding to the downlink data on the one channel resource or the one group of channel resources corresponding to the information of the one channel resource or the one group of channel resources, where the information is obtained by the channel resource obtaining module 850, and on the channel resource of the physical uplink control channel corresponding to the channel resource parameter obtained by the channel resource obtaining module 850.

Figure 8B:
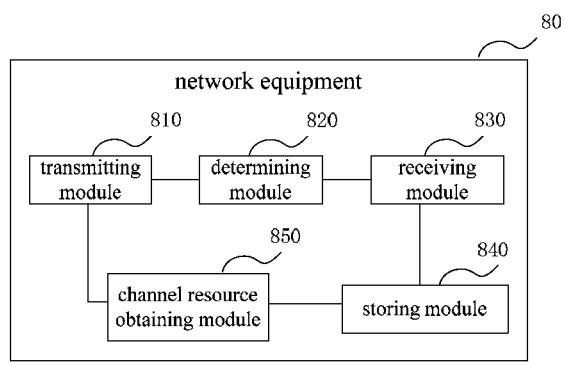
FIG. 8b is a schematic structural diagram of a network device according to another embodiment of the present invention.

Where, the receiving module 830 is further configured to receive the information of the one channel resource or the one group of channel resources of the physical uplink control channel through receiving a radio resource control (RRC) signaling; the channel resource obtaining module 850 is specifically configured to obtain the information of the one channel resource or the one group of channel resources of the physical uplink control channel through the RRC signaling received by the receiving module 830; or as shown in FIG. 8*b*, the network device further includes a storing module 840, the network device further includes the storing module 840, the storing module 840 is configured to store the information of the one channel resource or the one group of channel resources, where the information is received by the receiving module 830; the channel resource obtaining module 850 is specifically configured to obtain the information of the one channel resource or the one group of channel resources from the storing module 840.

Figure 9:
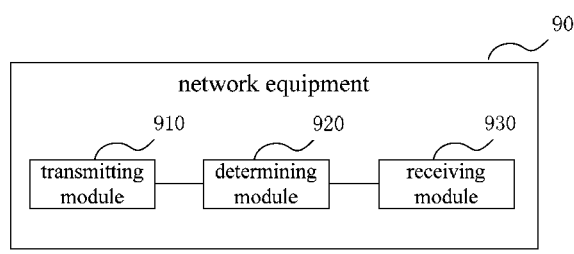
FIG. 9 is a schematic structural diagram of a network device according to another embodiment of the present invention.

An embodiment of the present invention provides a network device 90, this embodiment can perform the steps of the method in the above embodiments. This embodiment gives only simple description of the structure of the network device 90, the specific implementation can be found in the description of the above embodiments. As shown in FIG. 9, the network device 90 of this embodiment includes a transmitting module 910, a determining module 920, and a receiving module 930.

The transmitting module 910 is configured to transmit downlink data scheduled by the downlink control channel to a UE, where the downlink control channel is a downlink control channel corresponding to a primary serving cell, the primary serving cell is a primary serving cell of at least two serving cells configured for the UE, the at least two serving cells further include at least one secondary serving cell;

the determining module 920 is configured to determine the cell identity information corresponding to the primary serving cell after the transmitting module 910 transmits the downlink data, and transfer the cell identity information to the receiving module 930.

The receiving module 930 detects, on the channel resource which is allocated for the UE for feeding back the physical uplink control channel, the physical uplink control channel corresponding to the downlink data by using the cell identity information transferred by the determining module 920, where the physical uplink control channel is generated by the UE by using the cell identity information corresponding to the primary serving cell.

Since this embodiment performs the method of the above embodiments, the technical effect which can be obtained by this embodiment can be found in the description of the above embodiments, which will not be repeated here.

The transmitting module 910 is further configured to notify one channel resource or one group of channel resources of the physical uplink control channel to the user equipment and the network devices corresponding to all secondary serving cells configured for the user equipment.

Specifically, the receiving module 910 is specifically configured to detect, by using the cell identity information, the physical uplink control channel corresponding to the downlink data on the one channel resource or one group of channel resources and on the channel resource of the physical uplink control channel which implicitly corresponds to the downlink control channel; or detect, by using the cell identity information, the physical uplink control channel which corresponds to the downlink data on the one channel resource or the one group of channel resources.

Further, the receiving module 910 is specifically configured to detect the physical uplink control channel corresponding to the downlink data on the uplink carrier corresponding to the primary serving cell.

In embodiments of the present invention, the cell identity information can be a cell identity and/or a virtual cell identity.

By adopting the network device of this embodiment, it achieves that the same PUCCH channel resource is reused among multiple network devices, without the need for learning in real time the scheduling condition of the PUCCH channel resources of other base stations, thereby achieving the cell splitting gain, and improving the use of the PUCCH channel resource.

An embodiment of the present invention provides a communication system, the communication system includes a user equipment 50, a network device 80 and a network device 90 which are provided in the above embodiments. Please refer to the description of the above embodiments for detail, which will not be repeated here. In addition, the user equipment 50, the network device 80 and the network device 90 which are provided in this embodiment can perform the steps of the method in the above embodiments, the specific implementations can be found in the description of the above method embodiments.

Figure 10:
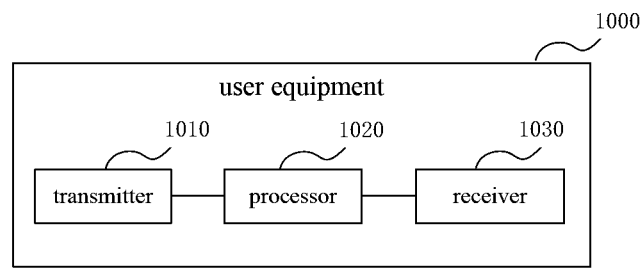
FIG. 10 is a schematic structural diagram of a user equipment according to another embodiment of the present invention.

An embodiment of the present invention provides a user equipment 1000, this embodiment can perform the steps of the method in the above embodiments. This embodiment gives only simple description of the structure of the user equipment 1000, the specific implementation can be found in the description of the above embodiments. As shown in FIG. 10, the user equipment 1000 of this embodiment includes a receiver 1010, a processor 1020, and a transmitter 1030.

The receiver 1010 is configured to receive downlink data which is scheduled by a downlink control channel from a network device, where the downlink control channel is the downlink control channel corresponding to a serving cell, the serving cell is a serving cell of at least two serving cells configured for the UE, the at least two serving cells include one primary serving cell and at least one secondary serving cell;

the processor 1020 is configured to select identity information according to the downlink control channel corresponding to the downlink data received by the receiver 1010, and generate the physical uplink control channel corresponding to the downlink data by using the identity information; and the transmitter 1030 is configured to transmit the physical uplink control channel on a channel resource of the physical uplink control channel generated by the processor 1020.

Since this embodiment performs the method of the above embodiments, the technical effect which can be obtained by this embodiment can be found in the description of the above embodiments, which will not be repeated here.

Where, the processor 1020 is specifically configured to, if the downlink data received by the receiver 1010 does not include downlink data scheduled by the downlink control channel corresponding to the primary serving cell, select second identity information, and generate the physical uplink control channel corresponding to the downlink data by using the second identity information; or, the processor 1020 is specifically configured to, if the downlink data received by the receiver 1010 includes the downlink data scheduled by the downlink control channel corresponding to the primary serving cell, select first identity information, and generate the physical uplink control channel corresponding to the downlink data by using the first identity information.

Where, the processor 1020 is specifically configured to select the identity information in a following way: select cell identity information corresponding to the primary serving cell as the first identity information; or the processor 1020 is specifically configured to select the identity information in a following way: if the receiver 1010 receives only downlink data scheduled by the downlink control channel corresponding to one secondary serving cell, select cell identity information corresponding to the one secondary serving cell as the second identity information; or the processor 1020 is specifically configured to select the identity information in a following way: if the receiver 1010 receives only downlink data scheduled by downlink control channels corresponding to multiple secondary serving cells in the at least one secondary serving cell, select the second identity information according to the predefined rule.

In another embodiment, the processor 1020 is specifically configured to, if the downlink data received by the receiver 1010 includes only the downlink data scheduled by the downlink control channel corresponding to the primary serving cell, select the first identity information, and generate the physical uplink control channel corresponding to the downlink data by using the first identity information; and/or the processor 1020 is specifically configured to, if the downlink data received by the receiver 1010 includes the downlink data scheduled by the downlink control channel corresponding to the secondary serving cell, select the second identity information, and generate the physical uplink control channel corresponding to the downlink data by using the second identity information.

Further, in this embodiment, the processor 1020 is specifically configured to select the identity information in a following way: select the cell identity information corresponding to the primary serving cell as the first identity information; or the processor is specifically configured to select the identity information in a following way: if the receiver receives the downlink data scheduled by downlink control channels corresponding to the primary serving cell and only one secondary serving cell, select the cell identity information corresponding to the one secondary serving cell as the second identity information; or the processor is specifically configured to select the identity information in a following way: if the receiver receives only the downlink data scheduled by downlink control channels corresponding to multiple secondary serving cells in the at least one secondary serving cell, select the second identity information according to the predefined rule.

Further, the processor 1020 is specifically configured to select the second identity information according to the predefined rule in a following way: select the cell identity information corresponding to any one secondary serving cell of the multiple secondary serving cells as the second identity information; or, select the cell identity information which is notified by the network device corresponding to the primary serving cell as the second identity information; or, select the common cell identity information corresponding to the at least one secondary serving cell as the second identity information.

Where, the processor 1020 is specifically configured to select the cell identity information in a following way: select a cell identity and/or a virtual cell identity as the cell identity information.

In a first implementation, the processor 1020 is further configured to obtain information of one channel resource or one group of channel resources of the physical uplink control channel; the transmitter 1030 is specifically configured to transmit the physical uplink control channel on the channel resource of the physical uplink control channel in a following way: transmit the physical uplink control channel generated by the processor 1020 on the one channel resource or the one group of channel resources corresponding to the information of the one channel resource or the one group of channel resources, where the information is obtained by the processor 1020.

In a second implementation, the processor 1020 is further configured to determine that the serving cell corresponding to the downlink data received by the receiver 1010 is the primary serving cell, and obtain a channel resource parameter of the downlink control channel corresponding to the primary serving cell; the transmitter 1030 is specifically configured to transmit the physical uplink control channel on the channel resource of the physical uplink control channel in a following way: transmit the physical uplink control channel generated by the processor 1020 on the first channel resource corresponding to the channel resource parameter obtained by the processor 1020, where the first channel resource is the channel resource of the physical uplink control channel corresponding to the channel resource parameter obtained by the processor 1020; or the processor 1020 is further configured to determine that the serving cell corresponding to the downlink data received by the receiver 1010 includes the secondary serving cell, and obtain the information of one channel resource or one group of channel resources of the physical uplink control channel; the transmitter 1030 is specifically configured to transmit the physical uplink control channel on the channel resource of the physical uplink control channel in a following way: transmit the physical uplink control channel generated by the processor 1020 on the second channel resource; where the second channel resource is the one channel resource or the one group of channel resources corresponding to the information of the one channel resource or the one group of channel resources, where the information is obtained by the processor 1020.

In a third implementation, the processor 1020 is further configured to determine that the serving cell corresponding to the downlink data received by the receiver 1010 is one secondary serving cell in the at least one secondary serving cell, and obtain a channel resource parameter of the downlink control channel corresponding to the one secondary serving cell; the transmitter 1030 is specifically configured to transmit the physical uplink control channel on the channel resource of the physical uplink control channel in a following way: transmit the physical uplink control channel on the third channel resource; where the third channel resource is the channel resource of the physical uplink control channel corresponding to the channel resource parameter obtained by the processor 1020; or the processor 1020 is further configured to determine that the serving cell corresponding to the downlink data received by the receiver 1010 includes the primary serving cell and one or more secondary serving cells in the at least one secondary serving cell, or includes multiple secondary serving cells in the at least one secondary serving cell, and obtain the information of one channel resource or one group of channel resources of the physical uplink control channel; the transmitter 1030 is specifically configured to transmit the physical uplink control channel on the channel resource of the physical uplink control channel in a following way: transmit the physical uplink control channel on the fourth channel resource, where the fourth channel resource is the one channel resource or the one group of channel resources corresponding to the information of the one channel resource or the one group of channel resources, where the information is obtained by the processor 1020; or the processor 1020 is configured to determine that the serving cell corresponding to the downlink data received by the receiver 1010 is one secondary serving cell in the at least one secondary serving cell, and obtain the information of one channel resource or one group of channel resources of the physical uplink control channel; the transmitter 1030 is specifically configured to transmit the physical uplink control channel on the channel resource of the physical uplink control channel in a following way: transmit the physical uplink control channel on the fifth channel resource; where, if the fourth channel resource is the one group of channel resources obtained by the processor 1020, the fifth channel resource is one channel resource in the one group of channel resources.

In a fourth implementation, the processor 1020 is further configured to determine that the serving cell corresponding to the downlink data received by the receiver 1010 is the primary serving cell, and obtain a channel resource parameter of the downlink control channel corresponding to the primary serving cell; the transmitter 1030 is specifically configured to transmit the physical uplink control channel on the channel resource of the physical uplink control channel in a following way: transmit the physical uplink control channel on the first channel resource, where the first channel resource is the channel resource corresponding to the channel resource parameter obtained by the processor 1020; or the processor 1020 is further configured to determine that the serving cell corresponding to the downlink data received by the receiver 1010 is one secondary serving cell in the at least one secondary serving cell, and obtain a channel resource parameter of the downlink control channel corresponding to the one secondary serving cell in the at least one secondary serving cell; the transmitter 1030 is specifically configured to transmit the physical uplink control channel on the channel resource of the physical uplink control channel in a following way: transmit the physical uplink control channel on the third channel resource, where the third channel resource is the channel resource of the physical uplink control channel corresponding to the channel resource parameter obtained by the processor 1020; or the processor 1020 is further configured to determine that the serving cell corresponding to the downlink data received by the receiver 1010 includes multiple secondary serving cells in the at least one secondary serving cell, or includes the primary serving cell and one or more secondary serving cells in the at least one secondary serving cell, and obtain information of one channel resource or one group of channel resources of the physical uplink control channel; the transmitter 1030 is specifically configured to transmit the physical uplink control channel on the channel resource of the physical uplink control channel in a following way: transmit the physical uplink control channel on the fourth channel resource; where the fourth channel resource is the one channel resource or the one group of channel resources corresponding to the information of the one channel resource or the one group of channel resources, where the information is obtained by the processor 1020;

the processor 1020 is further configured to determine that the serving cell corresponding to the downlink data received by the receiver 1010 is one secondary serving cell in the at least one secondary serving cell, and obtain the information of one channel resource or one group of channel resources of the physical uplink control channel; the transmitter 1030 is specifically configured to transmit the physical uplink control channel on the channel resource of the physical uplink control channel in a following way: transmit the physical uplink control channel on the fifth channel resource; where, if the fourth channel resource is the one group of channel resources, the fifth channel resource is one channel resource in the one group of channel resources.

Figure 10A:
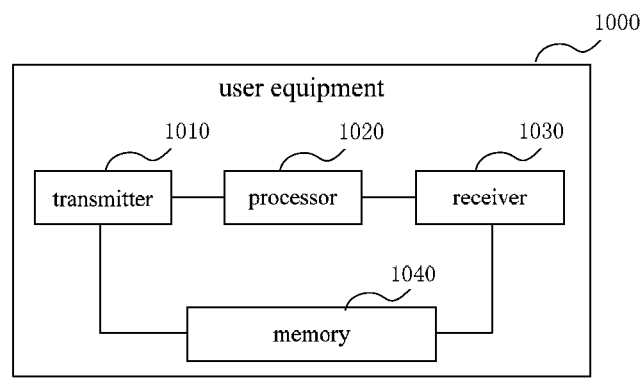
FIG. 10a is a schematic structural diagram of a user equipment according to another embodiment of the present invention.

In the above implementations, the receiver 1010 is further configured to receive the information of the one channel resource or the one group of channel resources, where the information is transmitted through a radio resource control (RRC) signaling by the network device; the processor 1020 is specifically configured to obtain the information of the one channel resource or the one group of channel resources through obtaining the RRC signaling received by the receiver 1010; or as shown in FIG. 10*a*, the user equipment further includes a memory 1040, the memory 1040 is configured to store the information of the one channel resource or the one group of channel resources; the processor 1020 is specifically configured to obtain the information of the one channel resource or the one group of channel resources from the memory 1040.

Further, the transmitter 1030 is specifically configured to transmit the physical uplink control channel generated by the processor 1020 on the channel resource of the physical uplink control channel upon the following:

if the downlink data received by the receiver 1010 includes the downlink data scheduled by the downlink control channel corresponding to the primary serving cell, then bear the channel resource on an uplink carrier corresponding to the primary serving cell and transmit the physical uplink control channel generated by the processor 1020 on the channel resource; or if the receiver 1010 receives only the downlink data scheduled by the downlink control channel corresponding to one of the multiple secondary serving cells, then bear the channel resource on an uplink carrier corresponding to the one secondary serving cell, and transmit the physical uplink control channel generated by the processor 1020 on the channel resource; or if the receiver 1010 receives only the downlink data scheduled by the downlink control channels corresponding to multiple secondary serving cells in the at least one secondary serving cell, then bear the channel resource on an uplink carrier corresponding to one secondary serving cell of the multiple secondary serving cells, and transmit the physical uplink control channel generated by the processor 1020 on the channel resource.

In the another embodiment above, the transmitter 1030 is specifically configured to transmit the physical uplink control channel generated by the processor 1020 on the channel resource of the physical uplink control channel in a following ways:

if the downlink data received by the receiver 1010 includes only the downlink data scheduled by the downlink control channel corresponding to the primary serving cell, then bear the channel resource on the uplink carrier corresponding to the primary serving cell; or if the downlink data received by the receiver 1010 includes the downlink data scheduled by the downlink control channel corresponding to the secondary serving cell, then bear the channel resource on the uplink carrier corresponding to the secondary serving cell.

Further, the processor 1020 is specifically configured to generate the physical uplink control channel corresponding to the downlink data by using the selected identity information in a following way:

for the feedback mode of downlink control channel format 1b in combination with channel selection, generate a sequence of the physical uplink control channel by using the selected identity information; or, for the feedback mode of downlink control channel format 3, generate a cyclic shift pattern of the modulation symbol of the physical uplink control channel by using the selected identity information and/or perform mapping of the orthogonal spreading code by using the selected identity information.

Further, the processor 1020 is further configured to, for the feedback mode of format 3, if the receiver 1010 does not receive the downlink data scheduled by the downlink control channel corresponding to the primary serving cell, determine a codebook size of the physical uplink control channel according to the transmission mode of the downlink data of the secondary serving cell; or, if the receiver 1010 receives the downlink data scheduled by the downlink control channel corresponding to the primary serving cell, determine a codebook size of the physical uplink control channel according to transmission modes of the downlink data of the primary serving cell and the secondary serving cell;

the processor 1020 is further configured to generate the physical uplink control channel in a following way: generate the physical uplink control channel according to the codebook size determined by the processor 1020 and the identity information selected by the processor 1020.

Further, the processor 1020 is further configured to determine transmit power of the physical uplink control channel according to a path loss value and a transmit power control (TPC) command in the downlink control channel corresponding to the downlink data received by the receiver 1010; where, if the downlink data received by the receiver 1010 does not include the downlink data scheduled by the downlink control channel of the primary serving cell, the TPC command is a TPC command in the downlink control channel of one secondary serving cell which corresponds to the downlink data or in the downlink control channel of one secondary serving cell of multiple secondary serving cells which correspond to the downlink data; or, if the downlink data received by the receiver 1010 includes the downlink data scheduled by the downlink control channel of the primary serving cell, the TPC command in the downlink control channel of one secondary serving cell which corresponds to the downlink data or in the downlink control channel of one secondary serving cell of multiple secondary serving cells which correspond to the downlink data; the transmitter 1030 is specifically configured to transmit the physical uplink control channel generated by the processor 1020 in a following way: transmit the physical uplink control channel generated by the processor 1020 using the transmit power determined by the processor 1020.

Further, in the another embodiment above, the processor 1020 is further configured to determine transmit power of the physical uplink control channel according to a path loss value and a transmit power control (TPC) command in the downlink control channel corresponding to the downlink data received by the receiver 1010; where, if the downlink data received by the receiver 1010 includes only the downlink data scheduled by the downlink control channel of the primary serving cell, the TPC command is a TPC command in the downlink control channel of the primary serving cell; or, if the downlink data received by the receiver 1010 includes the downlink data scheduled by the downlink control channel of the secondary serving cell, the TPC command is a TPC command in the downlink control channel of one secondary serving cell which corresponds to the downlink data or in the downlink control channel of one secondary serving cell of multiple secondary serving cells which correspond to the downlink data;

Further, the processor 1020 is further configured to determine the path loss in a following way: if the downlink data received by the receiver 1010 does not include the downlink data scheduled by the downlink control channel corresponding to the primary serving cell, determine that the path loss is first path loss; if the downlink data received by the receiver 1010 includes the downlink data scheduled by the downlink control channel corresponding to the primary serving cell, then the path loss is second path loss, or if the downlink data received by the receiver 1010 includes only the downlink data scheduled by the downlink control channel corresponding to the primary serving cell, determine that the path loss is the second path loss; if the downlink data received by the receiver 1010 includes the downlink data scheduled by the downlink control channel of the secondary serving cell, then determine that the path loss is the first path loss; where, if the transmitter transmits the physical uplink control channel on the uplink carrier corresponding to the primary serving cell, the receiver 1010 is further configured to receive the downlink reference signal transmitted by the primary serving cell; the processor 1020 is further configured to measure first receive power of the downlink reference signal which is transmitted by the primary serving cell and received by the receiver 1010; and determine the second path loss according to first transmit power of the downlink reference signal transmitted by the primary serving cell and the measured first receive power; the receiver 1010 is further configured to receive the downlink reference signal transmitted by one secondary serving cell in the at least one secondary serving cell; the processor 1020 is further configured to measure second receive power of the downlink reference signal which is transmitted by the one secondary serving cell and received by the receiver 1010; and determine the first path loss according to second transmit power of the downlink reference signal transmitted by the one secondary serving cell, the measured second receive power and the power offset;

or, if the transmitter transmits the physical uplink control channel on the uplink carrier corresponding to one secondary serving cell in the at least one secondary serving cell, the receiver 1010 is further configured to receive the downlink reference signal transmitted by the primary serving cell; the processor 1020 is further configured to measure the first receive power of the downlink reference signal which is transmitted by the primary serving cell and received by the receiver 1010; and determine the second path loss according to the first transmit power of the downlink reference signal transmitted by the primary serving cell, the measured first receive power and the power offset; the receiver 1010 is further configured to receive the downlink reference signal transmitted by one secondary serving cell in the at least one secondary serving cell; the processor 1020 is configured to measure the second receive power of the downlink reference signal which is transmitted by the one secondary serving cell and received by the receiver 1010; and determine the first path loss according to the second transmit power of the downlink reference signal transmitted by the one secondary serving cell and the measured second receive power.

By adopting the user equipment of this embodiment, it achieves that the same PUCCH channel resource is reused among multiple network devices, without the need for learning in real time the scheduling condition of the PUCCH channel resources of other base stations, thereby achieving the cell splitting gain, and improving the use of the PUCCH channel resource.

Figure 11:
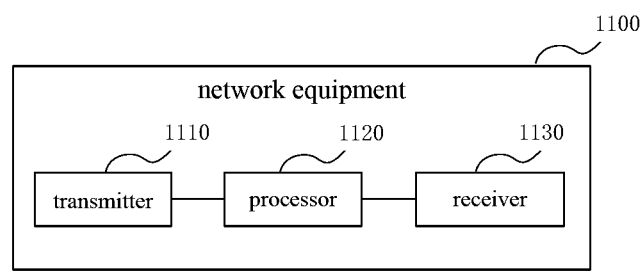
FIG. 11 is a schematic structural diagram of a network device according to another embodiment of the present invention.

An embodiment of the present invention further provides a network device 1100, this embodiment can perform the steps of the method in the above embodiments. This embodiment gives only simple description of the structure of this network device, the specific implementation can be found in the description of the above embodiments. As shown in FIG. 11, the network device of this embodiment includes a transmitter 1110, a processor 1120, and a receiver 1130.

The transmitter 1110 is configured to transmit downlink data scheduled by a downlink control channel to a user equipment (UE), where the downlink control channel is the downlink control channel corresponding to an secondary serving cell, or the downlink control channel is the downlink control channel corresponding to a primary serving cell which corresponds to the network side equipment, the secondary serving cell is a serving cell of at least two serving cells configured for the UE, the at least two serving cells further include the primary serving cell;

the processor 1120 is configured to determine identity information which may be used by the UE after the transmitter 1110 transmits the downlink data; and the receiver 1130 is configured to detect, by using the identity information which may be used and is determined by the processor 1120, the physical uplink control channel corresponding to the downlink data on the channel resource for feeding back the physical uplink control channel, where the physical uplink control channel is generated by the UE by using one kind of the identity information which may be used by the UE.

Since this embodiment performs the method of the above embodiments, the technical effect which can be obtained by this embodiment can be found in the description of the above embodiments, which will not be repeated here.

Further, the processor 1120 is specifically configured to determine the identity information which may be used by the UE, including:

the cell identity information corresponding to the primary serving cell, the cell identity information corresponding to the secondary serving cell which corresponds to the network device, and the identity information determined according to the predefined rule; or the identity information which may be used by the UE includes the cell identity information corresponding to the primary serving cell and the cell identity information corresponding to all secondary serving cells configured for the UE;

where the cell identity information is a cell identity and/or a virtual cell identity.

Further, the processor 1020 is specifically configured to determine the identity information according to the following predefined rule:

the cell identity information notified by the network device corresponding to the primary serving cell; or common cell identity information corresponding to all secondary serving cells configured for the UE.

Further, the processor 1020 is further configured to obtain information of one channel resource or one group of channel resources of the physical uplink control channel, and obtain a channel resource parameter of the downlink control channel corresponding to the downlink data transmitted by the transmitter 1110;

the receiver 1130 is specifically configured to detect the physical uplink control channel corresponding to the downlink data by using the identity information which may be used and is determined by the processor 1120 in a following way: detect, by using the identity information which may be used and is determined by the processor 1020, the physical uplink control channel corresponding to the downlink data on the one channel resource or the one group of channel resources corresponding to the information of the one channel resource or the one group of channel resources, where the information is obtained by the processor 1120, and on the channel resource of the physical uplink control channel corresponding to the channel resource parameter obtained by the processor 1120.

Figure 11A:
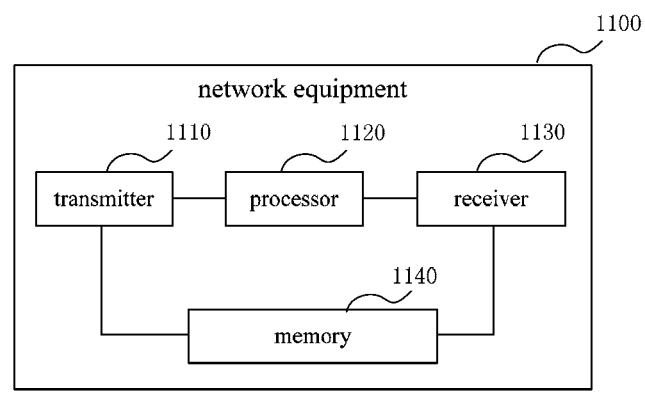
FIG. 11a is a schematic structural diagram of a network device according to another embodiment of the present invention.

Further, the receiver 1130 is further configured to receive the information of the one channel resource or the one group of channel resources of the physical uplink control channel through receiving a radio resource control (RRC) signaling; the processor 1120 is specifically configured to obtain the information of the one channel resource or the one group of channel resources of the physical uplink control channel through the RRC signaling received by the receiver 1130; or as shown in FIG. 11*a*, the network device further includes a memory 1140, the memory 1140 is configured to store the information of the one channel resource or the one group of channel resources, where the information is received by the receiver 1130; the processor 1120 is specifically configured to obtain the information of the one channel resource or the one group of channel resources from the memory 1140.

Figure 12:
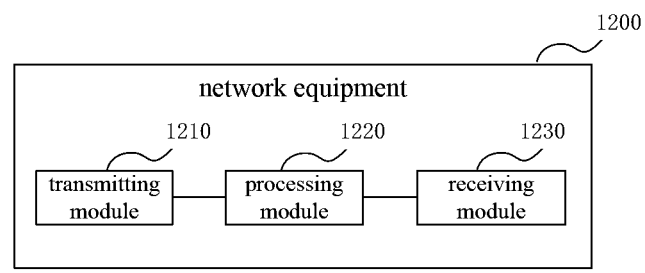
FIG. 12 is a schematic structural diagram of a network device according to another embodiment of the present invention.

An embodiment of the present invention further provides a network device 1200, this embodiment can perform the steps of the method in the above embodiments. This embodiment gives only simple description of the structure of this network device 1200, the specific implementation can be found in the description of the above embodiments. As shown in FIG. 12, the network device 1200 of this embodiment includes a transmitter 1210, a processor 1220, and a receiver 1230.

The transmitter 1210 is configured to transmit downlink data scheduled by a downlink control channel to UE, where the downlink control channel is the downlink control channel corresponding to a primary serving cell, the primary serving cell is a primary serving cell of at least two serving cells configured for the UE, the at least two serving cells further include at least one secondary serving cell.

The processor 1220 is configured to determine the cell identity information corresponding to the primary serving cell after the transmitter 1210 transmits the downlink data.

The receiver 1230 is configured to detect, by using the cell identity information, the physical uplink control channel corresponding to the downlink data on the channel resource which is allocated for the UE for feeding back the physical uplink control channel, where the physical uplink control channel is generated by the UE using the cell identity information of the primary serving cell.

Since this embodiment performs the method of the above embodiments, the technical effect which can be obtained by this embodiment can be found in the description of the above embodiments, which will not be repeated here.

The transmitter 1210 is further configured to notify one channel resource or one group of channel resources of the physical uplink control channel to the user equipment and the network devices corresponding to all secondary serving cells configured for the user equipment.

Specifically, the receiver 1230 is specifically configured to detect, by using the cell identity information, the physical uplink control channel corresponding to the downlink data on the one channel resource or one group of channel resources and on the channel resource of the physical uplink control channel which implicitly corresponds to the downlink control channel; or detect, by using the cell identity information, the physical uplink control channel which corresponds to the downlink data on the one channel resource or the one group of channel resources.

Further, the receiver 1230 is specifically configured to detect the physical uplink control channel corresponding to the downlink data on the uplink carrier corresponding to the primary serving cell.

In embodiments of the present invention, the cell identity information may be a cell identity and/or a virtual cell identity.

By adopting the network device of this embodiment, it achieves that the same PUCCH channel resource is reused among multiple network devices, without the need for learning in real time the scheduling condition of the PUCCH channel resources of other base stations, thereby achieving the cell splitting gain, and improving the use of the PUCCH channel resource.

An embodiment of the present invention provides a communication system, the communication system includes a user equipment 1000, a network device 1100 and a network device 1200 which are provided in the above embodiments. Please refer to the description of the above embodiments for detail, which will not be repeated here. In addition, the user equipment 1000, the network device 1100 and the network device 1200 which are provided in this embodiment can perform the steps of the method in the above embodiments, the specific implementations can be found in the description of the above method embodiments.

It should be noted that, embodiments of the present invention may be applied to a base station or a terminal of various communication systems. The user equipment and the network device provided in the above embodiments may further include a power controller, a decoding processor, a memory, and other components. The processing module in embodiments of the present invention may also be referred to as CPU. The memory may include read only memory and random access memory, and provide instructions and data to the processing module. A portion of the memory may also include non-volatile random access memory (NVRAM). In specific applications, the user equipment and the network device in embodiments of the present invention may further include a carrier for accommodating a transmitting circuit and a receiving circuit, so as to allow the user equipment or the network device to transmit and receive data with remote locations. The transmitting module and the receiving module may be coupled to an antenna. Each component is coupled with each other through a bus system, where the bus system includes a power bus, a control bus, and a state signal bus in addition to a data bus.

The processor disclosed in embodiments of the present invention may be an integrated circuit chip having signal processing capability. The processor may be a general processor, a digital signal processor (DSP), an application specific integrated circuit (ASIC), a field-programmable gate array (FPGA) or other programmable logic devices, discrete gate or transistor logic devices, or discrete hardware components, which can achieve or implement each method, step and logic diagram disclosed in embodiments of the present invention. The general processor may be a microprocessor or the processor may be any conventional processor, baseband processor, etc. The steps of methods disclosed in combination with embodiments of the present invention may be embodied directly as being implemented and completed by a hardware decoding processor, or by the combination of hardware and software modules in the decoding processor. The software module may be located in mature storage medium in the art such as random access memory, flash memory, read only memory, programmable read-only memory or electrically erasable programmable memory, registers, etc. The storage medium is located in the memory, the processing module reads the information from the memory, and the above method steps are completed in combination with hardware.

Through the above description of the implementations, those skilled in the art can clearly understand that the present invention can be implemented by hardware or firmware, or a combination thereof. When implemented by using software, the functions may be stored in computer readable medium or transferred as one or more instructions or code on computer readable medium. The computer readable medium includes computer storage medium and communication medium, where the communication medium includes any medium convenient for transferring computer program from one place to another. The storage medium may be any available medium which can be accessed by a computer. For example but not limited to: the computer readable medium can include RAM, ROM, EEPROM, CD-ROM or other optical disk storage, magnetic disk storage medium or other magnetic storage devices, or any other medium which can be used to carry or store desired program code in form of instructions or data structures and can be accessed by the computer. In addition, any connection can become computer readable medium suitably. For example, if the software is transferred from a website, a server, or other remote sources by using a coaxial cable, fiber optic cable, twisted pair, digital subscriber line (DSL), or wireless technologies such as infrared, radio, microwave and the like, then the coaxial cable, fiber optic cable, twisted pair, DSL, or wireless technologies such as infrared, radio, microwave and the like are included in fixing of their respective medium. As used herein, the disk (Disk) and disc (disc) include compact disc (CD), laser disc, optical disk, digital versatile disc (DVD), floppy disk and Blu-ray discs, where the Disk usually copies data magnetically, and the disc copies data optically by using the laser. The above combinations should also be included in the protection scope of the computer readable medium.

In summary, above are only preferred embodiments of technical solutions of the present invention, however the protection scope of the present invention is not limited to this. Any modification, substitution, improvement and the like in the spirit and principle of the present invention should all fall within the protection scope of the present invention.

What is claimed is:

1. A method for transmitting an uplink control channel, comprising:
    receiving, by a user equipment (UE), downlink data which is scheduled by a downlink control channel from a network device, wherein the downlink control channel corresponds to a serving cell, the serving cell is one of at least two serving cells configured for the UE, the at least two serving cells comprise one primary serving cell and at least one secondary serving cell;
    selecting identity information according to the downlink control channel;
    generating a physical uplink control channel corresponding to the downlink data using the selected identity information; and
    transmitting the physical uplink control channel on a channel resource of the physical uplink control channel by using transmit power, wherein
    the transmit power is determined according to a value of path loss and a transmit power control (TPC) command in the downlink control channel; wherein when the downlink control channel only corresponds to the secondary serving cell, the path loss is first path loss; when the downlink control channel only corresponds to the primary serving cell, the path loss is second path loss; and when the downlink control channel corresponds to the primary serving cell and the secondary serving cell, the path loss is second path loss;

or, when the downlink control channel only corresponds to the primary serving cell, the path loss is second path loss; when the downlink control channel only corresponds to the secondary serving cell, the path loss is first path loss; and when the downlink control channel corresponds to the secondary serving cell and the primary serving cell, the path loss is first path loss.

2. The method according to claim 1, wherein, when the downlink control channel does not correspond to the primary serving cell and corresponds to the secondary serving cell, the selected identity information is second identity information, generating the physical uplink control channel corresponding to the downlink data further comprises: generating the physical uplink control channel corresponding to the downlink data using the second identity information; or when the downlink control channel corresponds to the primary serving cell, the selected identity information is first identity information, generating the physical uplink control channel corresponding to the downlink data further comprises: generating the physical uplink control channel corresponding to the downlink data using the first identity information.

3. The method according to claim 2, wherein the first identity information is cell identity information corresponding to the primary serving cell;

when the downlink control channel corresponds to one secondary serving cell in the at least one secondary serving cell, the second identity information is cell identity information corresponding to the one secondary serving cell; or when the downlink control channel corresponds to multiple secondary serving cells in the at least one secondary serving cell, selecting the second identity information further comprises: selecting, by the UE, the second identity information according to a predefined rule.

4. A method for receiving an uplink control channel, comprising:

transmitting, by a network device, downlink data scheduled by a downlink control channel to a user equipment (UE), wherein the downlink control channel corresponds to a secondary serving cell which corresponds to the network device, the secondary serving cell is one of at least two serving cells configured for the UE, the at least two serving cells further comprise a primary serving cell;

determining identity information which is used by the UE; and detecting, using the identity information, a physical uplink control channel corresponding to the downlink data on a channel resource for feeding back the physical uplink control channel, wherein the physical uplink control channel is generated by the UE using the identity information and transmitted by the UE using transmit power of the physical uplink control channel, wherein the transmit power is determined by the UE according to a value of path loss and a transmit power control (TPC) command in the downlink control channel; wherein, when the downlink control channel only corresponds to the secondary serving cell, the path loss is first path loss; when the downlink control channel only corresponds to the primary serving cell, the path loss is second path loss; and when the downlink control channel corresponds to the primary serving cell and the secondary serving cell, the path loss is second path loss;

or, when the downlink control channel only corresponds to the primary serving cell, the path loss is second path loss; when the downlink control channel only corresponds to the secondary serving cell, the path loss is first path loss; and when the downlink control channel corresponds to the secondary serving cell and the primary serving cell the path loss is first path loss.

5. The method according to claim 4, wherein the identity information comprises one of the groups consisting of:

(a) cell identity information corresponding to the primary serving cell, cell identity information corresponding to the secondary serving cell which corresponds to the network device, and identity information determined according to a predefined rule; and (b) the cell identity information corresponding to the primary serving cell and cell identity information corresponding to all secondary serving cells configured for the UE.

6. The method according to claim 4, wherein before detecting the physical uplink control channel corresponding to the downlink data, the method further comprises:

obtaining information of one channel resource or one group of channel resources of the physical uplink control channel;

wherein detecting the physical uplink control channel corresponding to the downlink data further comprises: detecting, using the identity information, the physical uplink control channel corresponding to the downlink data on the one channel resource or the one group of channel resources corresponding to the information of the one channel resource or the one group of channel resources and on the channel resource of the physical uplink control channel corresponding to the downlink control channel.

7. A user equipment (UE), comprises:

a receiver, configured to receive downlink data which is scheduled by a downlink control channel from a network device, where the downlink control channel corresponds to a serving cell, the serving cell is one of at least two serving cells configured for the UE, the at least two serving cells include one primary serving cell and at least one secondary serving cell;

a processor, configured to select identity information according to the downlink control channel corresponding to the downlink data received by the receiver, and generate a physical uplink control channel corresponding to the downlink data using the identity information; and a transmitter, configured to transmit the physical uplink control channel on a channel resource of the physical uplink control channel generated by the processor by using transmit power, wherein the transmit power is determined according to a value of path loss and a transmit power control (TPC) command in the downlink control channel; wherein, when the downlink control channel only corresponds to the secondary serving cell, the path loss is first path loss; when the downlink control channel only corresponds to the primary serving cell, the path loss is second path loss; and when the downlink control channel corresponds to the primary serving cell and the secondary serving cell the path loss is second path loss;

or, when the downlink control channel only corresponds to the primary serving cell, the path loss is second path loss; when the downlink control channel only corresponds to the secondary serving cell, the path loss is first path loss; and when the downlink control channel corresponds to the secondary serving cell and the primary serving cell, the path loss is first path loss.

8. The UE according to claim 7, wherein
the processor is configured to, when the downlink control channel does not correspond to the primary serving cell and corresponds to the secondary serving cell, select second identity information, and generate the physical uplink control channel corresponding to the downlink data by using the second identity information; and,
the processor is configured to, when the downlink control channel corresponds to the primary serving cell, select first identity information, and generate the physical uplink control channel corresponding to the downlink data using the first identity information.

9. The UE according to claim 8, wherein
the processor is configured to select the identity information in a following way: (a) selecting cell identity information corresponding to the primary serving cell as the first identity information;
(b) when the downlink control channel corresponds to one secondary serving cell in the at least one secondary serving cell, selecting cell identity information corresponding to the one secondary serving cell as the second identity information; or
(c) when the downlink control channel corresponds to multiple secondary serving cells in the at least one secondary serving cell, selecting the second identity information according to a predefined rule.

10. The UE according to claim 7, wherein
the processor is configured to, when the downlink control channel corresponds to the primary serving cell, select first identity information, and generate the physical uplink control channel corresponding to the downlink data by using the first identity information; and
the processor is configured to, when the downlink control channel corresponds to the secondary serving cell, select second identity information, and generate the physical uplink control channel corresponding to the downlink data by using the second identity information.

11. The UE according to claim 10, wherein
the processor is configured to select the identity information by one of the following:
(a) selecting cell identity information corresponding to the primary serving cell as the first identity information;
(b) when the downlink control channel corresponds to the primary serving cell and only one secondary serving cell in the at least one secondary serving cell, selecting cell identity information corresponding to the one secondary serving cell as the second identity information; and
(c) when the downlink control channel corresponds to multiple secondary serving cells in the at least one secondary serving cell, selecting the second identity information according to a predefined rule.

12. A network device, comprises:
a transmitter, configured to transmit downlink data scheduled by a downlink control channel to a user equipment (UE), where the downlink control channel corresponds to an secondary serving cell, or a primary serving cell which corresponds to the network device, the secondary serving cell is one of at least two serving cells configured for the UE, the at least two serving cells further include one primary serving cell;
a processor, configured to determine identity information which is used by the UE after the transmitter transmits the downlink data; and
a receiver, configured to, on a channel resource for feeding back a physical uplink control channel, detect the physical uplink control channel corresponding to the downlink data using the identity information, where the physical uplink control channel is generated by the UE using the identity information and transmitted by the UE using transmit power of the physical uplink control channel, wherein the transmit power is determined by the UE according to a value of path loss and a transmit power control (TPC) command in the downlink control channel; wherein, when the downlink control channel only corresponds to the secondary serving cell, the path loss is first path loss; when the downlink control channel only corresponds to the primary serving cell, the path loss is second path loss; and when the downlink control channel corresponds to the primary serving cell and the secondary serving cell, the path loss is second path loss;

or, when the downlink control channel only corresponds to the primary serving cell, the path loss is second path loss; when the downlink control channel only corresponds to the secondary serving cell, the path loss is first path loss; and when downlink control channel corresponds to the secondary serving cell and the primary serving cell, the path loss is first path loss.

13. The network device according to claim 12, wherein
the identity information determined by the processor comprises one of the groups consisting of: (a) cell identity information corresponding to the primary serving cell, cell identity information corresponding to the secondary serving cell which corresponds to the network device, and identity information determined according to a predefined rule; and
(b) the cell identity information corresponding to the primary serving cell and cell identity information corresponding to all secondary serving cells configured for the UE;
where the cell identity information is at least one of a cell identity and a virtual cell identity.

14. The network device according to claim 13, wherein
the processor is further configured to obtain information of one channel resource or one group of channel resources of the physical uplink control channel, and obtain a channel resource parameter of the downlink control channel corresponding to the downlink data transmitted by the transmitter;

the receiver is configured to detect the physical uplink control channel corresponding to the downlink data in a following way: detect, using the identity information, the physical uplink control channel corresponding to the downlink data on the one channel resource or the one group of channel resources corresponding to the information of the one channel resource or the one group of channel resources, where the information is obtained by the processor, and on the channel resource of the physical uplink control channel corresponding to the channel resource parameter obtained by the processor.

15. The method according to claim 1, wherein,
the first path loss is determined according to first transmit power and first receive power of a downlink reference signal transmitted by the secondary serving cell, wherein the first receive power is obtained through measuring, by the UE, the downlink reference signal transmitted by the secondary serving cell; and
the second path loss is determined according to second transmit power and second receive power of a downlink reference signal transmitted by the primary serving cell, wherein the second receive power is obtained through measuring, by the UE, the downlink reference signal transmitted by the primary serving cell.

16. The method according to claim 1, wherein,
when the UE transmits the physical uplink control channel on an uplink carrier corresponding to the primary serving cell, the second path loss is determined according to second transmit power and second receive power of a downlink reference signal transmitted by the primary serving cell, wherein the second receive power is obtained through measuring, by the UE, the downlink reference signal transmitted by the primary serving cell; the first path loss is determined according to first transmit power and first receive power of a downlink reference signal transmitted by the secondary serving cell and a power offset, wherein the first receive power is obtained through measuring, by the UE, the downlink reference signal transmitted by the secondary serving cell; or
when the UE transmits the physical uplink control channel on an uplink carrier corresponding to the secondary serving cell, the second path loss is determined according to second transmit power and second receive power of a downlink reference signal transmitted by the primary serving cell and a power offset, wherein the second receive power is obtained through measuring, by the UE, the downlink reference signal transmitted by the primary serving cell; the first path loss is determined according to first transmit power and first receive power of a downlink reference signal transmitted by the secondary serving cell, wherein the first receive power is obtained through measuring, by the UE, the downlink reference signal transmitted by the secondary serving cell.

17. The UE according to claim 7, wherein,
the processor is configured to determine the first path loss according to first transmit power and first receive power of a downlink reference signal transmitted by the secondary serving cell, wherein the first receive power is obtained through measuring, by the processor, the downlink reference signal transmitted by the secondary serving cell; and
the processor is configured to determine the second path loss according to second transmit power and second receive power of a downlink reference signal transmitted by the primary serving cell, wherein the second receive power is obtained through measuring, by the processor, the downlink reference signal transmitted by the primary serving cell.

18. The UE according to claim 7, wherein,
the processor is configured to, when the transmitter transmits the physical uplink control channel on an uplink carrier corresponding to the primary serving cell, determine the second path loss according to second transmit power and second receive power of a downlink reference signal transmitted by the primary serving cell, wherein the second receive power is obtained through measuring, by the processor, the downlink reference signal transmitted by the primary serving cell; determine the first path loss according to first transmit power and first receive power of a downlink reference signal transmitted by the secondary serving cell and a power offset, wherein the first receive power is obtained through measuring, by the processor, the downlink reference signal transmitted by the secondary serving cell; and
the processor is configured to, when the transmitter transmits the physical uplink control channel on an uplink carrier corresponding to the secondary serving cell, determine the second path loss according to second transmit power and second receive power of a downlink reference signal transmitted by the primary serving cell and a power offset, wherein the second receive power is obtained through measuring, by the processor, the downlink reference signal transmitted by the primary serving cell; determine the first path loss according to first transmit power and first receive power of a downlink reference signal transmitted by the secondary serving cell, wherein the first receive power is obtained through measuring, by the processor, the downlink reference signal transmitted by the secondary serving cell.

* * * * *